United States Patent
Jung et al.

(10) Patent No.: US 11,069,265 B2
(45) Date of Patent: Jul. 20, 2021

(54) FOLDABLE ELECTRONIC DEVICE INCLUDING ANTENNA

(71) Applicant: SAMSUNG ELECTRONICS CO., LTD., Suwon-si (KR)

(72) Inventors: Hojin Jung, Suwon-si (KR); Boochul Bae, Suwon-si (KR); Jongoh Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/536,558

(22) Filed: Aug. 9, 2019

(65) Prior Publication Data
US 2020/0051468 A1   Feb. 13, 2020

(30) Foreign Application Priority Data

Aug. 10, 2018  (KR) .................. 10-2018-0093954
Aug. 2, 2019   (KR) .................. 10-2019-0094397

(51) Int. Cl.
| *G06F 1/16* | (2006.01) |
| *G09F 9/30* | (2006.01) |
| *H01Q 1/08* | (2006.01) |
| *H01Q 1/22* | (2006.01) |
| *H04M 1/02* | (2006.01) |

(52) U.S. Cl.
CPC .......... *G09F 9/301* (2013.01); *G06F 1/1656* (2013.01); *G06F 1/1681* (2013.01); *H01Q 1/08* (2013.01); *H01Q 1/22* (2013.01); *H04M 1/0214* (2013.01)

(58) Field of Classification Search
CPC ..... G06F 1/1652; G06F 1/1681; G06F 1/1698
See application file for complete search history.

(56) References Cited

U.S. PATENT DOCUMENTS

| 4,359,707 A * | 11/1982 | Spannhake | ........... H01J 29/003 |
| | | | 335/284 |
| 5,394,160 A * | 2/1995 | Iwasaki | .................. H01Q 1/243 |
| | | | 343/702 |
| 6,225,959 B1 * | 5/2001 | Gordon | ................ H01Q 13/103 |
| | | | 343/700 MS |

(Continued)

FOREIGN PATENT DOCUMENTS

| EP | 2 690 844 | 1/2014 |
| EP | 3 343 693 | 7/2018 |

(Continued)

OTHER PUBLICATIONS

International Search Report dated Nov. 20, 2019 in counterpart International Patent Application No. PCT/KR2019/009970.

(Continued)

*Primary Examiner* — Adrian S Wilson
(74) *Attorney, Agent, or Firm* — Nixon & Vanderhye P.C.

(57) ABSTRACT

Various embodiments relate to an electronic device including an antenna. The electronic device may include: a foldable housing; a flexible display disposed on the foldable housing wherein at least a part of the flexible display is configured to be folded; and a frame disposed on a boundary portion of the flexible display and coupled to a side member of the foldable housing. The side member may include a conductive portion electrically connected to a communication circuit, and the frame may include a low-permittivity material.

11 Claims, 16 Drawing Sheets

(56) References Cited

U.S. PATENT DOCUMENTS

| | | | | |
|---|---|---|---|---|
| 6,577,496 B1* | 6/2003 | Gioscia | ............... | G06F 1/1616 345/156 |
| 6,879,293 B2* | 4/2005 | Sato | ............... | G06F 1/1616 343/702 |
| 8,896,487 B2* | 11/2014 | Chiang | ............... | H01Q 1/38 343/702 |
| 9,218,020 B1* | 12/2015 | Martinez | ............... | G06F 1/1656 |
| 9,972,892 B2* | 5/2018 | Noori | ............... | H01Q 1/2266 |
| 10,200,105 B2* | 2/2019 | Hu | ............... | H04B 7/0689 |
| 2002/0104769 A1* | 8/2002 | Kim | ............... | G06F 1/1637 206/320 |
| 2004/0227679 A1* | 11/2004 | Lu | ............... | H01Q 1/243 343/702 |
| 2006/0050169 A1* | 3/2006 | Misawa | ............... | G06F 1/1616 348/333.06 |
| 2006/0061512 A1* | 3/2006 | Asano | ............... | H01Q 1/2266 343/702 |
| 2006/0146488 A1* | 7/2006 | Kimmel | ............... | G06F 1/1616 361/679.04 |
| 2006/0244663 A1* | 11/2006 | Fleck | ............... | G06F 1/1698 343/700 MS |
| 2007/0097014 A1* | 5/2007 | Solomon | ............... | G06F 1/1616 345/1.1 |
| 2008/0039160 A1* | 2/2008 | Homer | ............... | H01Q 1/2275 455/575.7 |
| 2009/0185340 A1* | 7/2009 | Ji | ............... | G06F 1/1637 361/679.21 |
| 2010/0073241 A1* | 3/2010 | Ayala Vazquez | .... | H01Q 1/2266 343/702 |
| 2012/0307472 A1* | 12/2012 | Bohn | ............... | G06F 1/1652 361/807 |
| 2014/0031093 A1 | 1/2014 | Song et al. | | |
| 2014/0362513 A1 | 12/2014 | Nurmi | | |
| 2015/0062525 A1 | 3/2015 | Hirakata | | |
| 2017/0142241 A1 | 5/2017 | Kim et al. | | |
| 2017/0346164 A1 | 11/2017 | Kim et al. | | |
| 2018/0049329 A1 | 2/2018 | Seo et al. | | |
| 2018/0366813 A1 | 12/2018 | Kim et al. | | |
| 2018/0375189 A1* | 12/2018 | Hawaka | ............... | H01Q 1/2266 |
| 2019/0140342 A1 | 5/2019 | Lim et al. | | |
| 2020/0136668 A1* | 4/2020 | Chu | ............... | G06F 1/1652 |
| 2020/0176854 A1* | 6/2020 | Jung | ............... | H01Q 1/242 |

FOREIGN PATENT DOCUMENTS

| | | |
|---|---|---|
| EP | 3 439 103 | 2/2019 |
| KR | 10-2011-0037252 | 4/2011 |
| WO | 2017/183802 | 10/2017 |

OTHER PUBLICATIONS

Extended Search Report dated Jan. 7, 2020 in counterpart European Patent Application No. 19191295.5.

* cited by examiner

FOLDABLE ELECTRONIC DEVICE INCLUDING ANTENNA

CROSS-REFERENCE TO RELATED APPLICATIONS

This application is based on and claims priority under 35 U.S.C. § 119 to Korean Patent Application No. 10-2018-0093954, filed on Aug. 10, 2018, in the Korean Intellectual Property Office, and Korean Patent Application No. 10-2019-0094397 filed on Aug. 2, 2019, in the Korean Intellectual Property Office, the disclosures of which are incorporated by reference herein in their entireties.

BACKGROUND

1) Field

The disclosure relates to a foldable electronic device including an antenna.

2) Description of Related Art

Electronic devices having various structures have been introduced. For example, an electronic device may be formed to have a bending structure or a folding structure. As another example, an electronic device may include a flip cover, a dual display, a flexible display, and the like.

An electronic device may provide mobile communication service using an antenna. The antenna of the electronic device may be arranged in a portion of area of the inside and/or outside of the housing.

The housing of a foldable electronic device may be in a folded state or in a flat state around a hinge structure. The outer peripheral side surface of the housing of the foldable electronic device may be made of a metallic material, and a part of the metallic material may be used as an antenna.

However, the partial side surface used as an antenna and another side surface made of a metallic material are brought close to each other in the folded state, and the resultant proximity may degrade the performance of the antenna of the foldable electronic device.

SUMMARY

Various embodiments of the disclosure may provide a foldable electronic device capable of reducing degradation of performance of the antenna while the electronic device is in a folded state.

An electronic device according to various example embodiments may include: a foldable housing; a flexible display disposed on the foldable housing wherein at least a part of the flexible display is configured to be folded; and a frame disposed on a boundary portion of the flexible display and coupled to a side member of the foldable housing. The side member may include a conductive portion electrically connected to a communication circuit, and the frame may include a low-permittivity material.

A foldable electronic device according to various example embodiments may include: a first housing including a first surface, a second surface facing a direction opposite the first surface, and a first side housing surrounding at least a part of a first space between the first surface and the second surface; a second housing including a third surface facing the first surface of the first housing in a folded state of the foldable electronic device, a fourth surface facing a direction opposite the third surface, and a second side housing surrounding at least a part of a second space between the third surface and the fourth surface; a hinge arranged between the first housing and the second housing and defining a folding axis; a flexible display exposed through the first surface and the third surface; and a communication circuit disposed in the first space and/or the second space. Each of the first side housing and the second side housing may include a conductive portion. At least a part of the conductive portion of the first side housing may be electrically connected to the communication circuit.

Various example embodiments may provide a foldable electronic device capable of reducing degradation of performance of the antenna while the electronic device is in a folded state.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
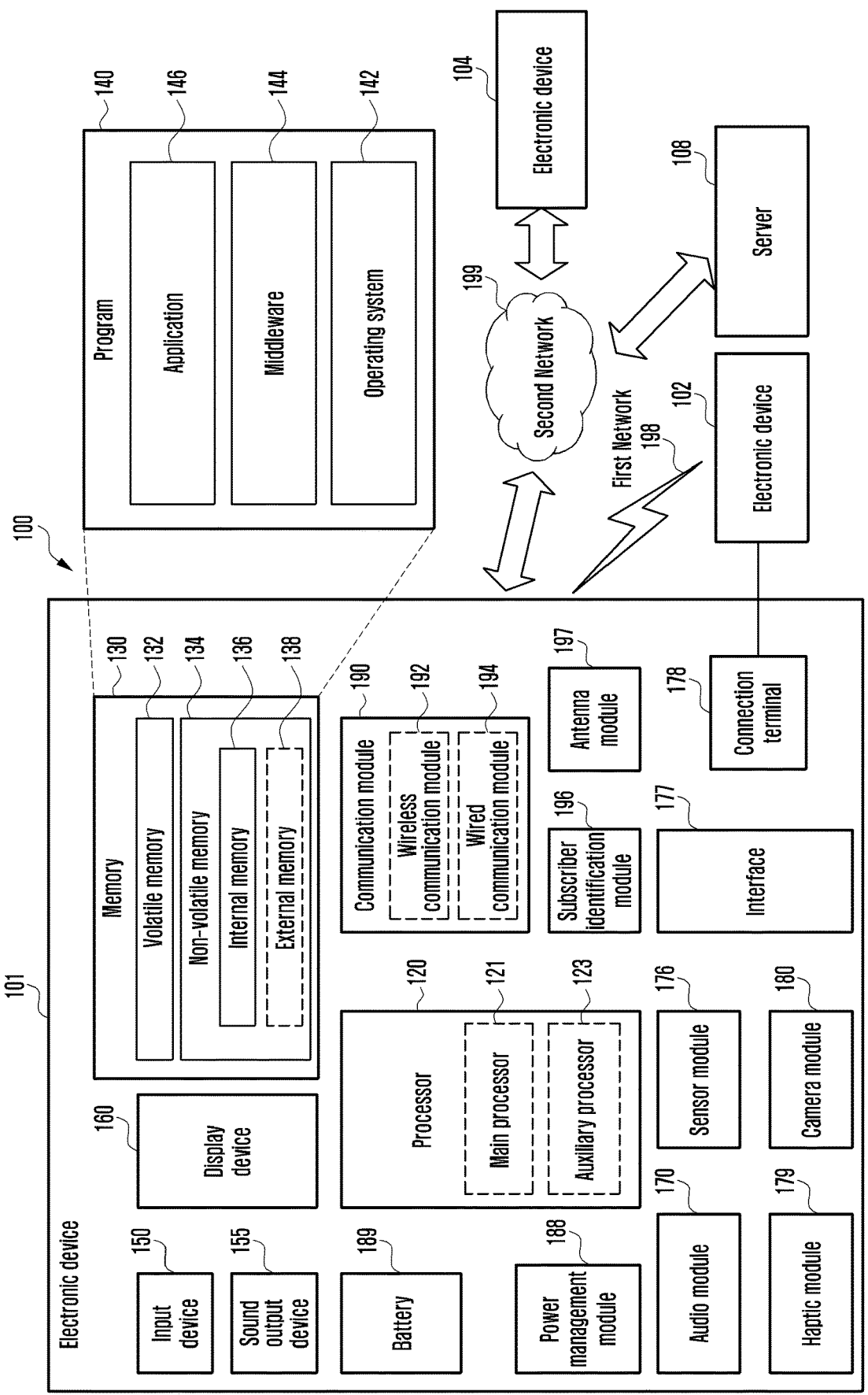
FIG. 1 is a block diagram illustrating an example electronic device in a network environment according to various embodiment.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
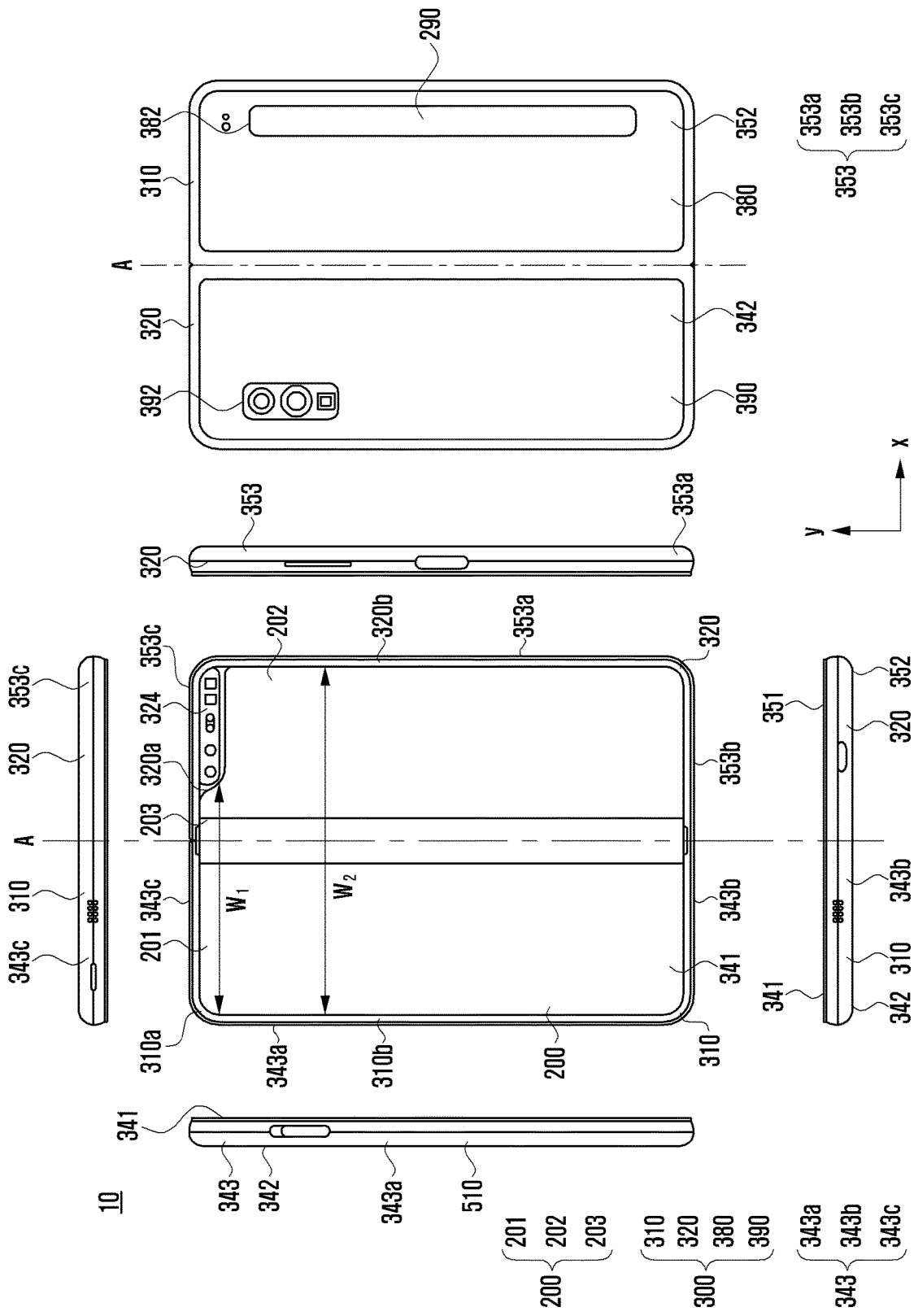
FIG. 2 is a diagram illustrating an example electronic device in a flat state according to an embodiment.

A foldable electronic device (for example, and without limitation, the electronic device 10 of FIG. 2) according to various example embodiments may include: a first housing (for example, the first housing structure 310 of FIG. 2) including a first surface (for example, the first surface 341 of FIG. 2), a second surface (for example, the second surface 342 of FIG. 2) facing a direction opposite the first surface 341, and a first side housing (for example, the first side housing 343 of FIG. 2) surrounding at least a part of a first space between the first surface 341 and the second surface 342; a second housing (for example, the second housing structure 320 of FIG. 2) including a third surface (for example, the third surface 351 of FIG. 2) facing the first surface 341 of the first housing structure 310 in a folded state of the foldable electronic device 10, a fourth surface (for example, the fourth surface 352 of FIG. 2) facing in a direction opposite the third surface 351, and a second side housing (for example, the second side housing 353 of FIG. 2) surrounding at least a part of a second space between the third surface 351 and the fourth surface 352; a hinge (for example, the hinge structure 340 of FIG. 4) arranged between the first housing structure 310 and the second housing structure 320 and defining a folding axis (axis A); a flexible display (for example, the display 200 of FIG. 2) exposed through the first surface 341 and the third surface 351; and a communication circuit (for example, the communication module 190 of FIG. 1) disposed in the first space and/or the second space. Each of the first side housing 343 and the second side housing 353 may include a conductive portion. At least a part of the conductive portion of the first side housing 343 may be electrically connected to the communication circuit. A corner portion of the first surface 341 parallel with the folding axis (axis A) may include a first protruding portion (for example, the first protruding portion 610 of FIG. 6). A corner portion of the third surface 351 parallel with the folding axis (axis A) may include a second protruding portion (for example, the second protruding portion 620 of FIG. 6) which is configured to contact the first protruding portion 610 in the folded state of the foldable electronic device 10. The first side housing 343 may include a first side surface 343a parallel to the folding axis (axis A), a second side surface 343b connected to one side of the first side surface 343a, and perpendicular to the folding axis (axis A), and a third side surface 343c connected to the other side of the first side surface 343a, and parallel to the second side surface 343b. The second side housing 353 may include a fourth side surface 353a parallel to the folding axis (axis A), a fifth side surface 353b connected to one side of the fourth side surface 353a, and arranged to be adjacent to the second side surface 343b in the folded state of the foldable electronic device 10, and a sixth side surface 353c connected to the other side of the fourth side surface 353a, and arranged to be adjacent to the third side surface 343c in the folded state of the foldable electronic device. At least a partial conductive portion of the conductive portion arranged on the second side surface 343b and the third side surface 343c may be electrically connected to the communication circuit.

When the foldable electronic device 10 is in the folded state, the first protruding portion 610 and the second protruding portion 620 may contact each other such that the second side surface 343b and the fifth side surface 353b are spaced apart from each other, and the third side surface 343c and the sixth side surface 353c are spaced apart from each other. Each of the first protruding portion 610 and the second protruding portion 620 may include a conductive portion. Each of the first protruding portion 610 and the second protruding portion 620 may include a nonconductive portion. The first protruding portion 610 and the second protruding portion 620 may have mutually symmetric shapes with reference to the folding axis (axis A).

When the foldable electronic device 10 is in the folded state, the second side surface 343b and the fifth side surface 353b may be spaced apart from each other by an interval of 3-5 mm. Corner portions of the first surface 341, which are adjacent to the second side surface 343b and the third side surface 343c, may be made of a low-permittivity material 710, the specific permittivity of which is lower than 10. Corner portions of the third surface 351, which are adjacent to the fifth side surface 353b and the sixth side surface 353c, may be made of the low-permittivity material 710. The low-permittivity material 710 may include, for example, and without limitation, an injection-molded material, or the like. The foldable electronic device may further include: a processor disposed in the first space and/or the second space and operatively connected to the communication circuit; and a memory disposed in the first space and/or the second space, operatively connected to the processor, and configured to store multiple application programs. The memory may store instructions that, when executed by the processor, cause the electronic device to receive an external signal through the communication circuit when the foldable electronic device 10 is in the folded state, to output a notification in response to reception of the external signal, and to provide a communication function while the foldable electronic device 10 remains in the folded state in response to receiving a designated input (e.g., from the user). The communication function may include, for example, and without limitation, a speech function.

Figure 3:
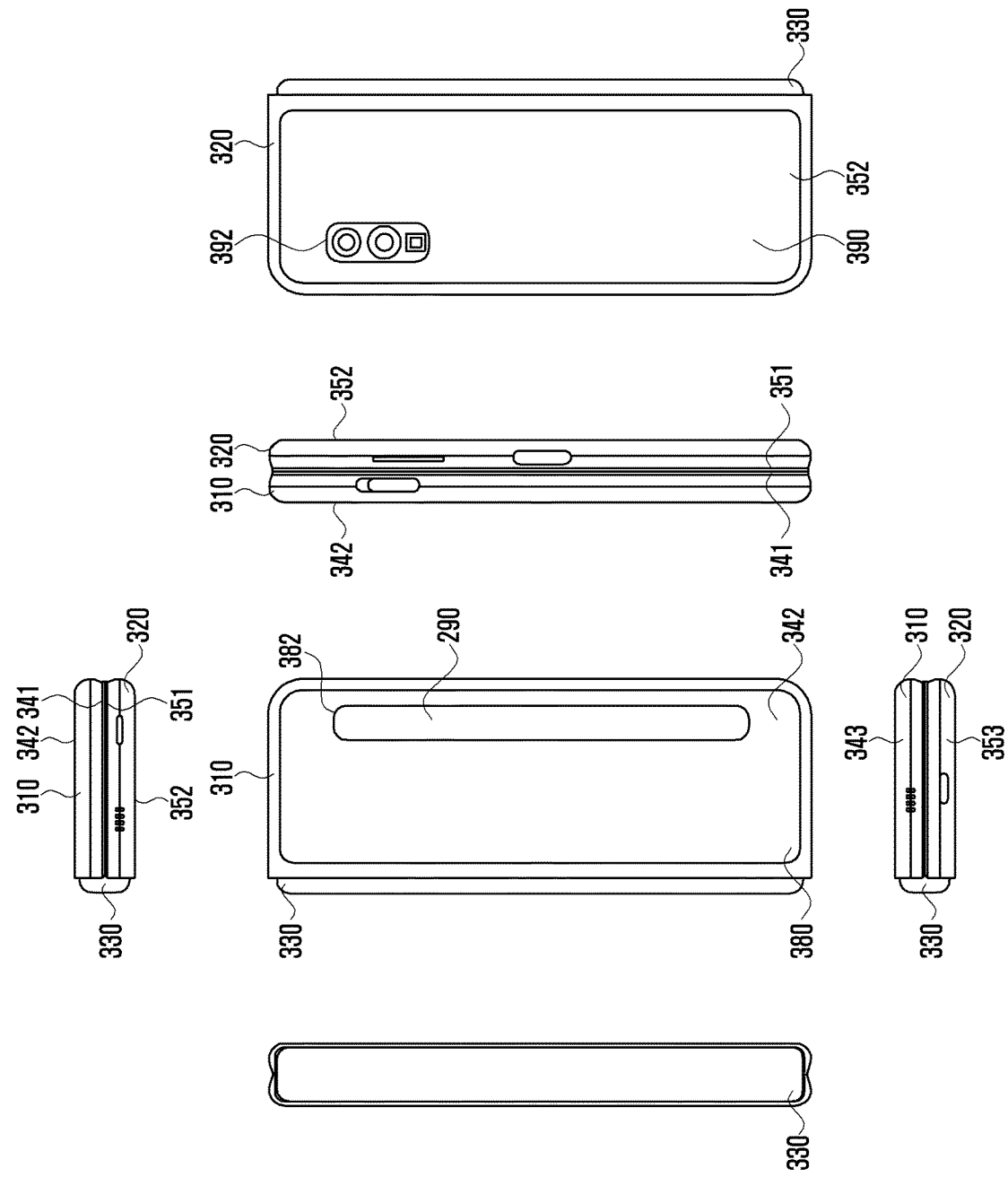
FIG. 3 is a diagram illustrating an example electronic device in a folded state according to an embodiment.

FIG. 2 is a diagram illustrating an example electronic device in a flat state according to an embodiment. FIG. 3 is a diagram illustrating an example electronic device in a folded state according to an embodiment.

Referring to FIG. 2 and FIG. 3, according to an embodiment, the electronic device 10 may include a foldable housing 300, a hinge cover 330 covering a foldable portion of the foldable housing, and a flexible or foldable display 200 (hereinafter, simply referred to as a "display 200") arranged in a space formed by the foldable housing 300. In this disclosure, the surface on which the display 200 is arranged may, for example, be referred to as the front surface of the electronic device 10. In addition, the opposite surface of the front surface may, for example, be referred to as the rear surface of the electronic device 10. Furthermore, a surface surrounding the space between the front surface and the rear surface may, for example, be referred to as a side surface of the electronic device 10.

In an embodiment, the foldable housing 300 may include a first housing structure 310, a second housing structure 320 (the term "housing structure" may be used interchangeably with the term "housing" throughout the disclosure) including a sensor area 324, a first rear cover 380, and a second rear cover 390. The foldable housing 300 of the electronic device 10 is not limited to the type and coupling illustrated in FIG. 2 and FIG. 3, and may be implemented by a combination and/or coupling of other shapes or components. For example, in another embodiment, the first housing 310 and the first rear cover 380 may be formed integrally, and the second housing 320 and the second rear cover 390 may be formed integrally.

In the illustrated embodiment, the first housing structure 310 and the second housing structure 320 may be arranged on both sides around the folding axis (axis A), and may have shapes that are symmetric overall with regard to the folding axis (axis A). As will be described later, the angle or distance between the first housing structure 310 and the second housing structure 320 may vary depending on whether the electronic device 10 is in a flat state, a folded state, or an intermediate state. In the illustrated embodiment, the second housing structure 320 additionally includes the sensor area 324 in which various sensors are arranged, unlike the first housing structure 310, but may have mutually symmetric shapes in the other areas.

In an embodiment, the first housing structure 310 may include a first surface 341 arranged to face the front surface of the electronic device 10 when the electronic device 10 is in the flat state, a second surface 342 arranged to face in the opposite direction to the first surface 341 when the electronic device 10 is in the flat state, and a first side housing 343 surrounding at least a part of the first space between the first surface 341 and the second surface 342.

In an embodiment, the second housing structure 320 may include a third surface 351 arranged to face the front surface of the electronic device 10 when the electronic device 10 is in the flat state, a fourth surface 352 arranged to face in the opposite direction to the third surface 351 when the electronic device 10 is in the flat state, and a second side housing 353 surrounding at least a part of the second space between the third surface 351 and the fourth surface 352. In an embodiment, the third surface 351 may face the first surface 341 when the electronic device 10 is in the folded state.

In an embodiment, as illustrated in FIG. 2, the first housing structure 310 and the second housing structure 320 may together form a recess in which the display 200 is contained. In the illustrated embodiment, due to the sensor area 324, the recess may have at least two different widths in a direction perpendicular to the folding axis (axis A).

For example, the recess may have a first width w1 between the first portion 310a of the first housing structure 310, which is parallel with the folding axis (axis A), and the first portion 320a of the second housing structure 320, which is formed on the periphery of the sensor area 324, and a second width w2 formed by the second portion 310b of the first housing structure 310 and the second portion 320b of the second housing structure 320, which does not correspond to the sensor area 324, and which is parallel with the folding axis (axis A).

In this case, the second width w2 may be formed to be larger than the first width w1. In other words, the first portion 310a of the first housing structure 310 and the first portion 320a of the second housing structure 320, which have mutually asymmetric shapes, may form the first width w1 of the recess, and the second portion 310b of the first housing structure 310 and the second portion 320b of the second housing structure 320, which have mutually symmetric shapes, may form the second width w2 of the recess. In an embodiment, the first portion 320a and the second portion 320b of the second housing structure 320 may have different distances from the folding axis (axis A). The width of the recess is not limited to the illustrated example. In various embodiments, the recess may have multiple widths depending on the type of the sensor area 324 or as the result of asymmetrically shaped portions of the first housing structure 310 and the second housing structure 320.

In an embodiment, at least a part of the first housing structure 310 and the second housing structure 320 may be made of a metallic material and/or a nonmetallic material having a magnitude of rigidity selected to support the display 200.

In an embodiment, the sensor area 324 may be formed to have a predetermined area adjacent to a corner of the second housing structure 320. However, the arrangement, shape, and size of the sensor area 324 are not limited to the illustrated example. For example, in another embodiment, the sensor area 324 may be provided in a specific area between another corner of the second housing structure 320 or the upper-end corner thereof and the lower-end corner thereof. In an embodiment, components embedded in the electronic device 10 to perform various functions may, for example, and without limitation, be exposed to the front surface of the electronic device 10 through the sensor area 324, through at least one opening provided in the sensor area 324, or the like. In various embodiments, the components may include various kinds of sensors. The sensors may include, for example, at least one of a front camera, a receiver, or a proximity sensor.

The first rear cover 380 may be arranged on one side of the folding axis on the rear surface of the electronic device and may have a substantially rectangular periphery, and the periphery may be surrounded by the first housing structure 310. Similarly, the second rear cover 390 may be arranged on the other side of the folding axis on the rear surface of the electronic device, and the periphery of the second rear cover 390 may be surrounded by the second housing structure 320. For example, the first rear cover 380 may be arranged on the second surface 342 of the first housing structure 310, and the second rear cover 390 may be arranged on the fourth surface 352 of the second housing structure 320.

In the illustrated embodiment, the first rear cover 380 and the second rear cover 390 may have substantially symmetrical shapes around the folding axis (axis A). However, the first rear cover 380 and the second rear cover 390 do not always have mutually symmetrical shapes, and, in another embodiment, the electronic device 10 may include a first rear cover 380 and a second rear cover 390 which have various shapes. In another embodiment, the first rear cover 380 may be formed integrally with the first housing structure 310, and the second rear cover 390 may be formed integrally with the second housing structure 320.

In an embodiment, the first rear cover 380, the second rear cover 390, the first housing structure 310, and the second housing structure 320 may form a space in which various components (for example, a printed circuit board or a battery) of the electronic device 10 may be arranged. In an embodiment, at least one component may be arranged on the rear surface of the electronic device 10 or may be visually exposed thereto. For example, at least a part of a sub display 290 may be visually exposed through the first rear area 382 of the first rear cover 380. In another embodiment, at least one component or sensor may be visually exposed through the second rear area 392 of the second rear cover 390. In various embodiments, the sensor may include a proximity sensor and/or a rear camera.

Referring to FIG. 3, the hinge cover 330 may be arranged between the first housing structure 310 and the second housing structure 320, and may be configured to cover an internal component (for example, a hinge structure or hinge). In an embodiment, the hinge cover 330 may be covered by parts of the first housing structure 310 and the second housing structure 320, or may be exposed to the outside depending on the state (flat state or folded state) of the electronic device 10.

For example, when the electronic device 10 is in a flat state as illustrated in FIG. 2, the hinge cover 330 may be covered by the first housing structure 310 and the second housing structure 320 such that the hinge cover 330 is not exposed. For example, when the electronic device 10 is in a folded state (for example, a fully folded state) as illustrated in FIG. 3, the hinge cover 330 may be exposed to the outside between the first housing structure 310 and the second housing structure 320. For example, in the case of an intermediate state in which the first housing structure 310 and the second housing structure 320 are folded with a certain angle, the hinge cover 330 may be partially exposed to the outside between the first housing structure 310 and the second housing structure 320. In this case, the exposed area may be smaller than in the fully folded state. In an embodiment, the hinge cover 330 may include a curved surface.

The display 200 may be arranged in a space formed by the foldable housing 300. For example, the display 200 may be seated on a recess formed by the foldable housing 300 of most of the front surface of the electronic device 10.

Accordingly, the front surface of the electronic device 10 may include a display 200, a partial area of the first housing structure 310 adjacent to the display 200, and a partial area of the second housing structure 320. The rear surface of the electronic device 10 may include a first rear cover 380, a partial area of the first housing structure 310 adjacent to the first rear cover 380, a second rear cover 390, and a partial area of the second housing structure 320 adjacent to the second rear cover 390.

The display 200 may be a display, at least a partial area of which may be deformed into a flat surface and/or a curved surface. In an embodiment, the display 200 may include a folding area 203, a first area 201 arranged on one side with reference to the folding area 203 (for example, on the left side of the folding area 203 illustrated in FIG. 2), and a second area 202 arranged on the other side (for example, on the right side of the folding area 203 illustrated in FIG. 2).

For example, the first area 201 may be arranged on the first surface 341 of the first housing structure 310, and the second area 202 may be arranged on the third surface 351 of the second housing structure 320.

The area division of the display 200 illustrated in FIG. 2 is merely an example, and the display 200 may also be divided into multiple (for example, at least four or two) areas depending on the structure or function thereof. For example, the area of the display 200 may be divided by a folding area 203 extending in parallel with the y-axis or by the folding axis (axis A) in the embodiment illustrated in FIG. 2, but the area of the display 200 may also be divided with reference to a different folding area (for example, a folding area parallel with the x-axis) or by a different folding axis (for example, a folding axis parallel with the x-axis) in another embodiment.

The first area 201 and the second area 202 may have shapes that are symmetric overall around the folding area 203. Unlike the first area 201, the second area 202 may include a notch that has been cut depending on whether or not the sensor area 324 is present, but may have a shape symmetric with that of the first area 201 in other areas. In other words, the first area 201 and the second area 202 may include portions having mutually symmetric shapes and portions having mutually asymmetric shapes.

Hereinafter, the operation of the first housing structure 310 and the second housing structure 320 depending on the state (for example, flat state or folded state) of the electronic device 10 and respective areas of the display 200 will be described.

In an embodiment, when the electronic device 10 is in a flat state (for example, the state illustrated in FIG. 2), the first housing structure 310 and the second housing structure 320 may be arranged to face in the same direction with an angle of 180° formed therebetween. The surface of the first area 201 of the display 200 and the surface of the second area 202 thereof may face in the same direction (for example, toward the front surface of the electronic device) with an angle of 180° formed therebetween. The folding area 203 may form the same plane with the first area 201 and the second area 202.

In an embodiment, when the electronic device 10 is in a folded state (for example, FIG. 3), the first housing structure 310 and the second housing structure 320 may be arranged to face each other. The surface of the first area 201 of the display 200 and the surface of the second area 202 thereof may face each other with a small angle (for example, and without limitation, 0-10°) formed therebetween. At least a part of the folding area 203 may be configured as a curved surface having a predetermined curvature.

In an embodiment, when the electronic device 10 is in an intermediate state, the first housing structure 310 and the second housing structure 320 may be arranged at a certain angle relative to each other. The surface of the first area 201 of the display 200 and the surface of the second area 202 thereof may form therebetween an angle that is larger than the angle in the folded state and smaller than the angle in the flat state. At least a part of the folding area 203 may be configured as a curved surface having a predetermined curvature. The curvature in this case may be smaller than the curvature in the folded state.

Figure 4:
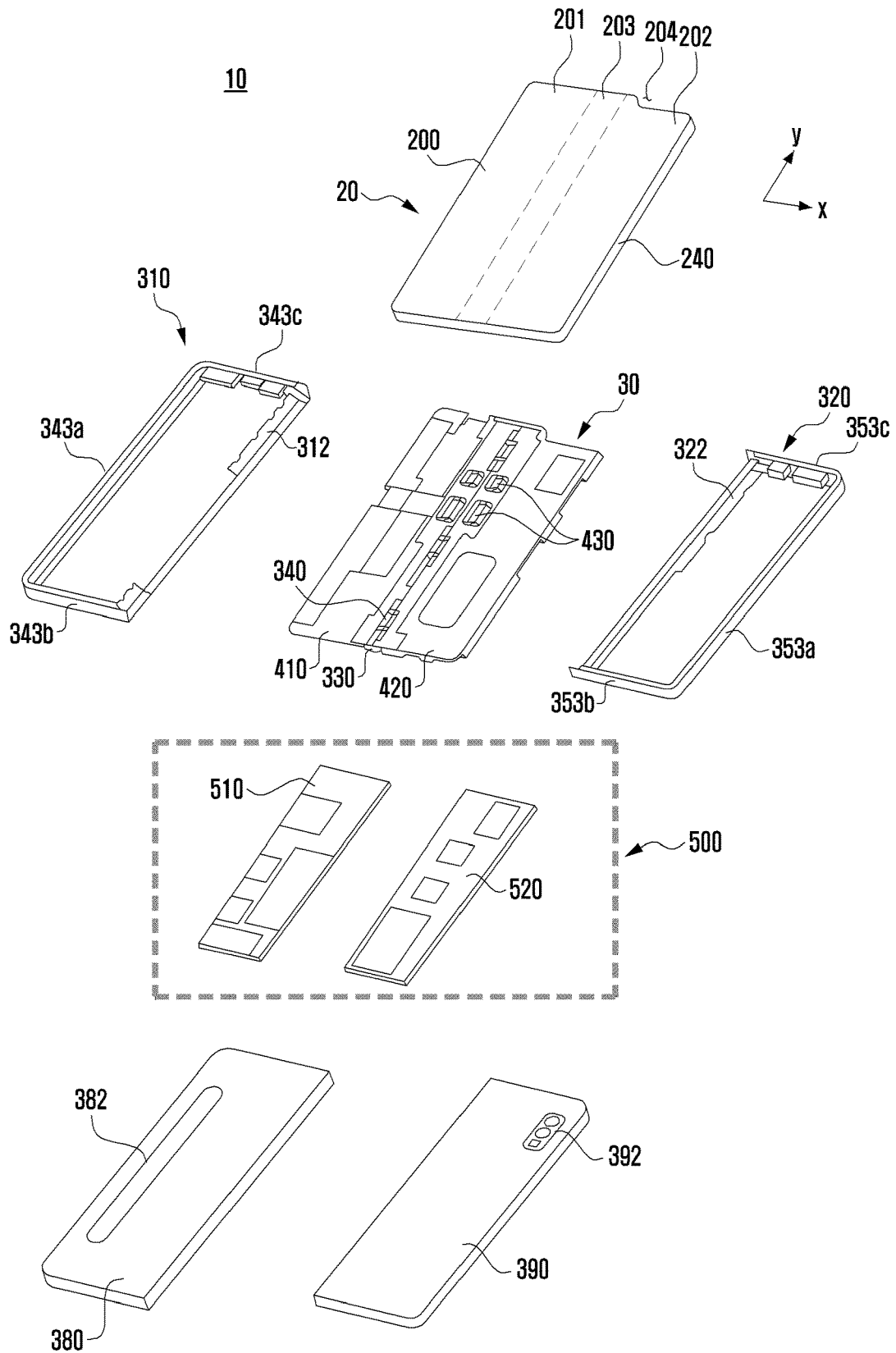
FIG. 4 is an exploded perspective view illustrating an example electronic device according to an embodiment.

FIG. 4 is an exploded perspective view illustrating an example electronic device according to an embodiment.

Referring to FIG. 4, in an embodiment, the electronic device 10 may include a display unit (e.g., including a display) 20, a bracket assembly (e.g., including a bracket) 30, a substrate unit (e.g., including a substrate) 500, a first housing structure (e.g., a first housing) 310, a second housing structure (e.g., a second housing) 320, a first rear cover 380, and a second rear cover 390. In this disclosure, the display unit 20 may be referred to as a display module, a display assembly, a display, or the like.

The display unit 20 may include a display 200 and at least one plate or layer 240 on which the display 200 is seated. In an embodiment, a plate 240 may be arranged between the display 200 and the bracket assembly 30. The display 200 may be arranged on at least a part of a surface of the plate 240 (for example, the upper surface with reference to FIG. 4). The plate 240 may be formed in a shape corresponding to that of the display 200. For example, the plate 240 may have a partial area formed in a shape corresponding to a notch 204 in the display 200.

The bracket assembly 30 may include a first bracket 410, a second bracket 420, a hinge structure 340 arranged between the first bracket 410 and the second bracket 420, a hinge cover 330 which covers the hinge structure 340 when seen from outside, and a wire member 430 (for example, a flexible printed circuit (FPC)) extending across the first bracket 410 and the second bracket 420.

In an embodiment, the bracket assembly 30 may be arranged between the plate 240 and the substrate unit 500. For example, the first bracket 410 may be arranged between the first area 201 of the display 200 and the first substrate 510. The second bracket 420 may be arranged between the second area 202 of the display 200 and the second substrate 520.

In an embodiment, at least a part of the wire member 430 and the hinge structure 340 may be arranged inside the bracket assembly 30. The wire member 430 may be arranged in a direction (for example, the x-axis direction) across the first bracket 410 and the second bracket 420. The wire member 430 may be arranged in a direction (for example, the x-axis direction) perpendicular to the folding axis (for example, the y-axis or the folding axis (A) of FIG. 2) of the folding area 203 of the electronic device 10. In an embodiment, the hinge structure 340 may be arranged between the first housing structure 310 and the second housing structure 320 to form (e.g., define) a folding axis (for example, the y-axis or the folding axis (A) of FIG. 2).

The substrate unit 500 may include, as mentioned above, a first substrate 510 arranged near the first bracket 410 and a second substrate 520 arranged near the second bracket 420. The first substrate 510 and the second substrate 520 may be arranged inside a space formed by the bracket assembly 30, the first housing structure 310, the second housing structure 320, the first rear cover 380, and the second rear cover 390. Components for implementing various functions of the electronic device 10 may be mounted on the first substrate 510 and the second substrate 520.

The first housing structure 310 and the second housing structure 320 may be assembled to be coupled to both sides of the bracket assembly 30, respectively, while the display unit 20 remains coupled to the bracket assembly 30. As will be described later, the first housing structure 310 and the second housing structure 320 may slide along both sides of the bracket assembly 30, respectively, so as to be coupled to the bracket assembly 30.

In an embodiment, the first housing structure 310 may include a first rotating support surface 312, and the second housing structure 320 may include a second rotating support surface 322 corresponding to the first rotating support surface 312. The first rotating support surface 312 and the second rotating support surface 322 may include a curved surface corresponding to a curved surface included in the hinge cover 330.

In an embodiment, when the electronic device 10 is in a flat state (for example, the electronic device of FIG. 2), the first rotating support surface 312 and the second rotating support surface 322 may cover the hinge cover 330 such that the hinge cover 330 is not exposed to the rear surface of the electronic device 10, or is exposed to a lesser extent. Meanwhile, when the electronic device 10 is in a folded state (for example, the electronic device of FIG. 3), the first rotating support surface 312 and the second rotating support surface 322 may rotate along the curved surface included in the hinge cover 330 such that the hinge cover 330 is exposed to the rear surface of the electronic device 10 to the largest extent.

Figure 5:
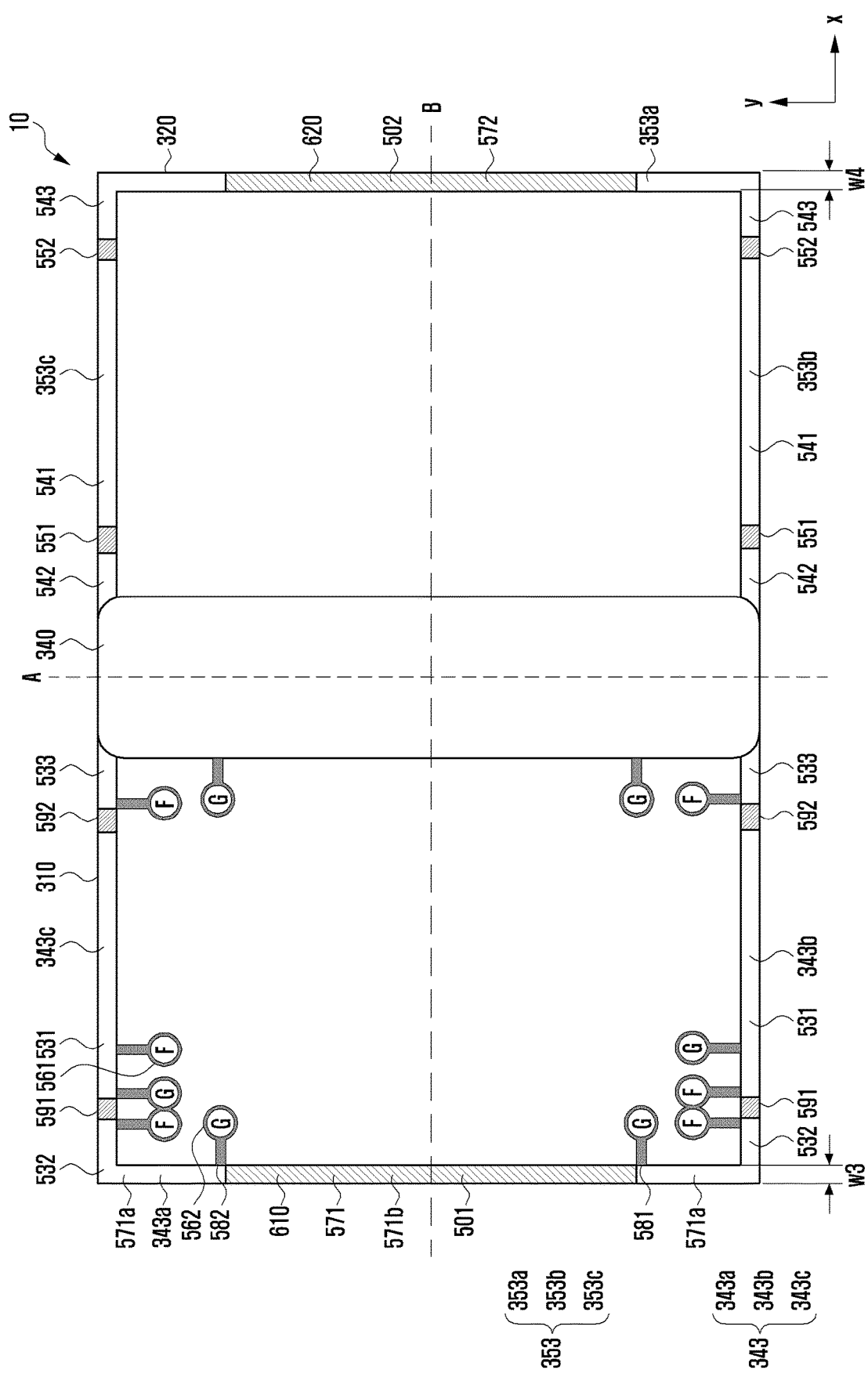
FIG. 5 is a diagram illustrating a first side housing and a second side housing of an example electronic device in a flat state according to an embodiment.

FIG. 5 is a diagram illustrating a first side housing and a second side housing of an example electronic device in a flat state according to an embodiment.

The electronic device 10 illustrated in FIG. 5 is substantially identical or similar to the electronic device 10 illustrated in FIG. 3 and FIG. 4, except for the elements described below, and the same elements are given the same reference numerals.

Referring to FIG. 5, an electronic device 10 according to an embodiment may include a first housing structure 310 and a second housing structure 320 arranged on both sides with reference to a hinge structure 340 that defines a folding axis A. In an embodiment, a mechanism referred to as a first side housing 343 may be arranged on a side surface of the first housing structure 310, and a mechanism referred to as a second side housing 353 may be arranged on a side surface of the second housing structure 320.

In an embodiment, the first side housing 343 may include a first side surface 343a which is parallel with the folding axis (axis A); a second side surface 343b which is connected to one side of the first side surface 343a (for example, the lower side of the first side surface 343a illustrated in FIG. 5), and which is perpendicular to the folding axis (axis A); and a third side surface 343c which is connected to the other side of the first side surface 343a (for example, the upper side of the first side surface 343a illustrated in FIG. 5), and which is parallel with the second side surface 343b. In an embodiment, the second side housing 353 may include a fourth side surface 353a which is parallel with the folding axis (axis A); a fifth side surface 353b which is connected to one side of the fourth side surface 353a (for example, the lower side of the fourth side surface 353a illustrated in FIG. 5), and which is arranged adjacent to the second side surface 343b when the electronic device 10 is in a folded state; and a sixth side surface 353c which is connected to the other side of the fourth side surface 353a (for example, the upper side of the fourth side surface 353a illustrated in FIG. 5), and which is arranged adjacent to the third side surface 343c when the electronic device 10 is in a folded state.

In an embodiment, each of the first side housing 343 and the second side housing 353 may include a conductive portion. For example, the first side housing 343 may include a metallic material except for a part of the second side surface 343b and a part of the third side surface 343c. The second side housing 353 may include a metallic material except for a part of the fifth side surface 353b and a part of the sixth side surface 353c.

In an embodiment, the second side surface 343b may include multiple conductive portions 531, 532, and 533 and at least one nonconductive portion 591 and 592 arranged between the multiple conductive portions 531, 532, and 533. For example, the second side surface 343b may include a first conductive portion 531, a second conductive portion 532 arranged on one side of the first conductive portion 531 (for example, the left side of the first conductive portion 531 illustrated in FIG. 5); a third conductive portion 533 arranged on the other side of the first conductive portion 531 (for example, the right side of the first conductive portion 531 illustrated in FIG. 5); a first nonconductive portion 591 arranged between the first conductive portion 531 and the second conductive portion 532; and a second nonconductive portion 592 arranged between the first conductive portion 531 and the third conductive portion 533. Similarly, the third side surface 343c may include a first conductive portion 531, a second conductive portion 532 arranged on one side of the first conductive portion 531 (for example, the left side of the first conductive portion 531 illustrated in FIG. 5); a third conductive portion 533 arranged on the other side of the first conductive portion 531 (for example, the right side of the first conductive portion 531 illustrated in FIG. 5); a first nonconductive portion 591 arranged between the first conductive portion 531 and the second conductive portion 532; and a second nonconductive portion 592 arranged between the first conductive portion 531 and the third conductive portion 533. In an embodiment, the conductive portions 531, 532, and 533 of the second side surface 343b and the conductive portions 531, 532, and 533 of the third side surface 343c may have mutually symmetric shapes around a horizontal axis which extends across the center of the folding axis (axis A), and which is perpendicular to the folding axis (axis A) (for example, an axis which is parallel with the x-axis, and which extends across the center of the folding axis (axis A)).

In an embodiment, the fifth side surface 353b may include multiple conductive portions 541, 542, and 543 and at least one nonconductive portions 551 and 552 arranged between the multiple conductive portions 541, 542, and 543. For example, the fifth side surface 353b may include a fourth conductive portion 541; a fifth conductive portion 542 arranged on one side of the fourth conductive portion 541 (for example, the left side of the fourth conductive portion 541 illustrated in FIG. 5); a sixth conductive portion 543 arranged on the other side of the fourth conductive portion 541 (for example, the right side of the fourth conductive portion 541 illustrated in FIG. 5); a third nonconductive portion 551 arranged between the fourth conductive portion 541 and the fifth conductive portion 542; and a fourth nonconductive portion 552 arranged between the fourth conductive portion 541 and the sixth conductive portion 543. Similarly, the sixth side surface 353c may include a fourth conductive portion 541; a fifth conductive portion 542 arranged on one side of the fourth conductive portion 541 (for example, the left side of the fourth conductive portion 541 illustrated in FIG. 5); a sixth conductive portion 543 arranged on the other side of the fourth conductive portion 541 (for example, the right side of the fourth conductive portion 541 illustrated in FIG. 5); a third nonconductive portion 551 arranged between the fourth conductive portion 541 and the fifth conductive portion 542; and a fourth nonconductive portion 552 arranged between the fourth conductive portion 541 and the sixth conductive portion 543. In an embodiment, the conductive portions 541, 542, and 543 of the fifth side surface 353b and the conductive portions 541, 542, and 543 of the sixth side surface 353c may have mutually symmetric shapes around a horizontal axis (axis B) which extends across the center of the folding axis (axis A), and which is perpendicular to the folding axis (axis A) (for example, an axis which is parallel with the x-axis, and which extends across the center of the folding axis (axis A)).

In an embodiment, each of the first conductive portion 531, the second conductive portion 532, and the third conductive portion 533 arranged on the second side surface 343b and/or the third side surface 343c may be a radiator (for example, an antenna) which radiates RF signals output from a communication module (for example, the communication module 190 of FIG. 1).

In an embodiment, the RF signals output from the communication module 190 may include first to third RF signals. According to an embodiment, the first RF signal may be a signal related to a low-frequency band, and the second RF signal and/or the third RF signal may be a signal related to a medium-frequency band or a high-frequency band. For example, the first RF signal may be a frequency for communication in a low band or mid-band (a low band of about 1 GHz or a mid-band of about 2.1 GHz), and the second RF signal and/or the third RF signal may be a frequency for communication in a high band or an ultra-high band (a high band of about 2.7 GHz or an ultra-high band of about 3.5 GHz). According to some embodiments, the second RF signal may be a signal for Bluetooth or Wi-Fi communication in an ISM band of 2.4 GHz or 5 GHz.

Figure 7:
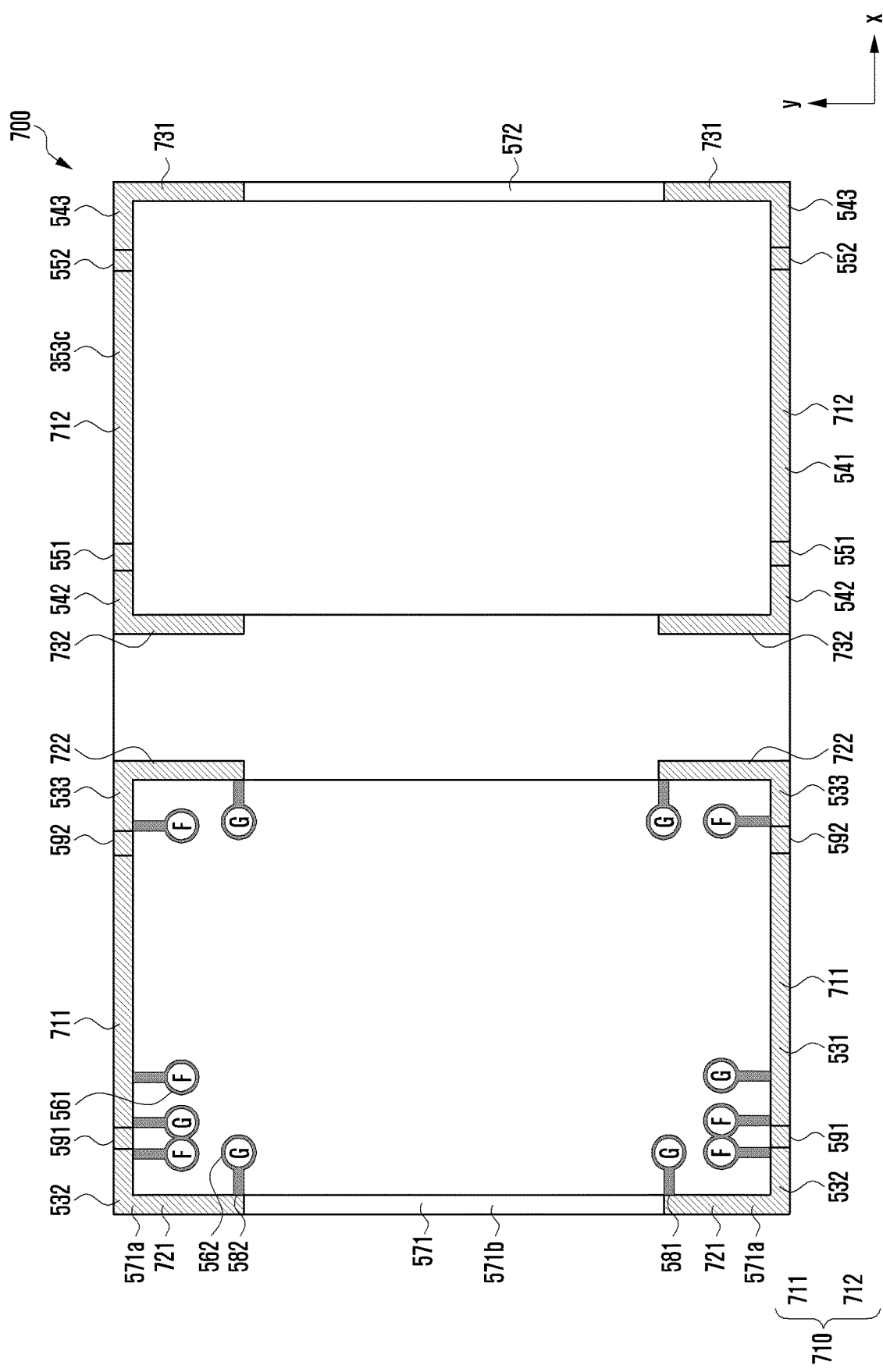
FIG. 7 is a diagram illustrating a first side housing and a second side housing of an example electronic device in a flat state according to another embodiment.

In an embodiment, the first conductive portion 531 may be a first antenna ANT #1 for resonating a first RF signal output from the communication module 190; the second conductive portion 532 may be a second antenna ANT #2 for resonating a second RF signal output from the communication module 190; and the third conductive portion 533 may be a third antenna ANT #3 for resonating a third RF signal output from the communication module 190. In an embodiment, each of the first conductive portion 531, the second conductive portion 532, and the third conductive portion 533 may be formed as a planar inverted F antenna (PIFA)-type antenna, and may be electrically connected to at least one feeding 561 formed on a printed circuit board (not illustrated) and to at least one ground 562. In FIGS. 5 and 7 the feedings may be labeled "F" and the grounds may be labeled "G".

In an embodiment, the first side surface 343a may include a seventh conductive portion 571, and a part 571a of either side of the seventh conductive portion 571 may be used as an antenna. For example, a part of one side of the seventh conductive portion 571 (for example, the lower side of the seventh conductive portion 571 illustrated in FIG. 5) may be connected to the second conductive portion 532 arranged on the second side surface 343b and used as a second antenna ANT #2. Similarly, a part of the other side of the seventh conductive portion 571 (for example, the upper side of the seventh conductive portion 571 illustrated in FIG. 5) may be connected to the second conductive portion 532 arranged on the third side surface 343c and used as a second antenna ANT #2.

In an embodiment, the other portion of the seventh conductive portion 571 than the two side portions 571a, that is, the center portion 571b, is not used as an antenna. For example, portions 571a of the seventh conductive portion 571, which are adjacent to both peripheries, respectively, may be electrically connected to the ground 562; and, with reference to the points 581 and 582 of connection to the ground 562, the seventh conductive portion 571 may be divided into portions 571a used as antennas and a portion 571b not used as an antenna. As another example, the seventh conductive portion 571 may be connected to the ground 562 at a first point 581 adjacent to the periphery of one side of the seventh conductive portion 571 (for example, the lower side of the seventh conductive portion 571 illustrated in FIG. 5) and may be connected to the ground 562 at a second point 582 adjacent to the periphery of the other side of the seventh conductive portion 571 (for example, the upper side of the seventh conductive portion 571 illustrated in FIG. 5); and the portion 571b between the first point 581 and the second point 582 may not be used as an antenna.

In an embodiment, when viewed from the front of the electronic device 10 (when seen from above the display of the electronic device 10), the width of each of the first protruding portion 610 and the second protruding portion 620 may be substantially identical to the width w3 of the first side housing 343 or the width w4 of the second side housing 353. For example, when viewed from the front of the electronic device 10, there may be arranged, on the front surface of the electronic device 10, a display 200, a first side housing 343 surrounding a part of the display 200, and a second side housing 353 surrounding another part of the display 200; and the width w3 of the first side housing 343 and the width w4 of the second side housing 353 may be constant.

Figure 6:
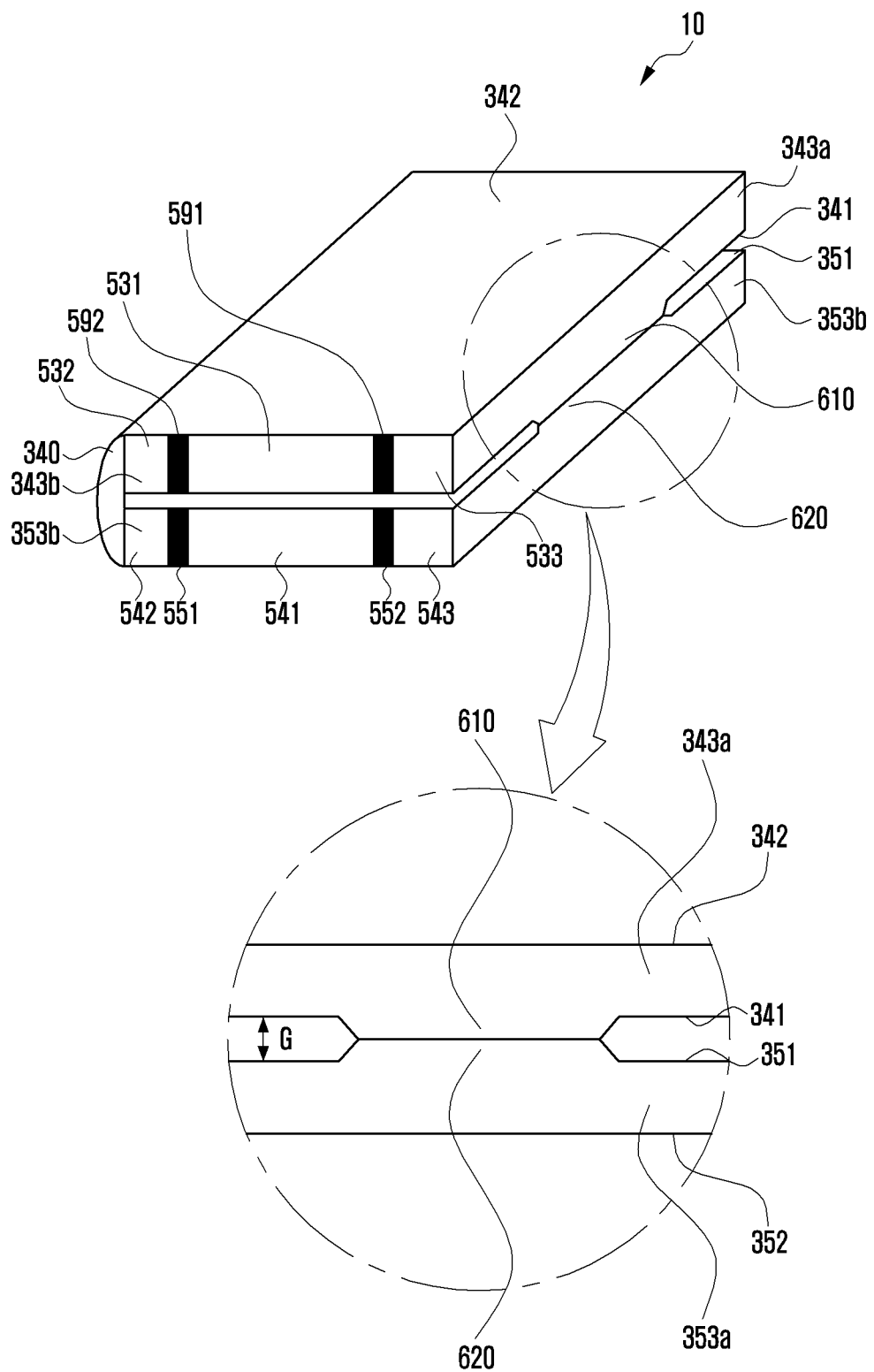
FIG. 6 is a diagram illustrating an example electronic device in a folded state according to an embodiment.

FIG. 6 is a diagram illustrating the electronic device illustrated in FIG. 5 in a folded state.

Referring to FIG. 6, in an embodiment, the electronic device 10 may include a first housing structure 310 including a first surface 341, a second surface 342 facing in the opposite direction to the first surface 341, and a first side housing 343 surrounding at least a part of a first space between the first surface 341 and the second surface 342; a second housing structure 320 including a third surface 351 which faces the first surface 341 of the first housing structure 310 when the electronic device 10 is in the folded state, a fourth surface 352 facing in the opposite direction to the third surface 351, and a second side housing 353 surrounding at least a part of a second space between the third surface 351 and the fourth surface 352; and a hinge structure 340 arranged between the first housing structure 310 and the second housing structure 320 and defining a folding axis (axis A).

In an embodiment, a first protruding portion 610 may be formed on a corner portion of the first surface 341, which is parallel with the folding axis (axis A), and a second protruding portion 620 may be formed on a corner portion of the third surface 351, which is parallel with the folding axis (axis A), so as to contact the first protruding portion 610 when the electronic device 10 is in the folded state. For example, the first protruding portion 610 may be formed adjacent to a portion 571b of the seventh conductive portion 571 arranged on the first side surface 343a, which is not used as an antenna, such as the portion 501 indicated by the dotted lines in FIG. 5. As another example, the first protruding portion 610 may be arranged to overlap with a part 571b of the seventh conductive portion 571 when viewed from the front of the electronic device 10 (when seen from above the display of the electronic device 10), and the overlapping part of the seventh conductive portion 571 may be a portion 571b not used as an antenna. Similarly, the second protruding portion 620 may be formed adjacent to the conductive portion 572 of the fourth side surface 353a, such as the other portion 502 indicated by the dotted lines in FIG. 5. As another example, the second protruding portion 620 may be arranged to overlap with a part of the conductive portion 572 of the fourth side surface 353a when viewed from the front of the electronic device 10 (when seen from above the display of the electronic device 10).

In an embodiment, when the electronic device 10 is in the folded state, the first protruding portion 610 and the second protruding portion 620 may contact each other such that the second side surface 343b and the fifth side surface 353b are spaced apart from each other, and the third side surface 343c and the sixth side surface 353c are spaced apart from each other. In an embodiment, when the electronic device 10 is in the folded state, the first protruding portion 610 and the second protruding portion 620 may contact each other such that a gap G is formed between the second side surface 343b and the fifth side surface 353b, and a gap is similarly formed between the third side surface 343c and the sixth side surface 353c.

In an embodiment, each of the first protruding portion 610 and the second protruding portion 620 may be made of a metallic material. For example, each of the first protruding portion 610 and the second protruding portion 620 may include a conductive portion. In an embodiment, the conductive portion of each of the first protruding portion 610 and the second protruding portion 620 may be made of the same material as that of the conductive portion of each of the first side housing 343 and the second side housing 353.

In an embodiment, each of the first protruding portion 610 and the second protruding portion 620 may include a non-metallic material. For example, each of the first protruding portion 610 and the second protruding portion 620 may include a nonconductive portion. In an embodiment, the nonconductive portion of each of the first protruding portion 610 and the second protruding portion 620 may be made of the same material as the nonconductive portion of each of the first side housing 343 and the second side housing 353. For example, at least a part of the first protruding portion 610 and the second protruding portion 620 may be made of a nonconductive injection-molded material.

In an embodiment, the first protruding portion 610 and the second protruding portion 620 may have mutually symmetric shapes with reference to the folding axis (axis A). In various embodiments, the first protruding portion 610 and the second protruding portion 620 do not necessary have mutually symmetric shapes, and the length, shape, width, thickness, or structure of the first protruding portion 610 and the second protruding portion 620 may be variously modified.

In an embodiment, when the electronic device 10 is in the folded state, the first protruding portion 610 and the second protruding portion 620 may contact each other such that the second side surface 343b and the fifth side surface 353b (or the third side surface 343c and the sixth side surface 353c) are spaced apart from each other by an interval of, for example, and without limitation, 3-5 mm. For example, when the electronic device 10 is in the folded state, the first protruding portion 610 and the second protruding portion 620 may contact each other such that a gap corresponding to an interval of, for example, at least 3-5 mm may be formed between the second side surface 343b and the fifth side surface 353b (or the third side surface 343c and the sixth side surface 353c).

An electronic device 10 according to an embodiment may be configured such that, when the electronic device 10 is in the folded state, the second side surface 343b and the fifth side surface 353b are spaced apart from each other, thereby reducing degradation of performance of the antenna arranged on the second side surface 343b (or the third side surface 343c). An electronic device 10 according to an embodiment may be configured such that the second side surface 343b and the fifth side surface 353b (or the third side surface 343c and the sixth side surface 353c) are spaced from each other by an interval of, for example, 3-5 mm, thereby reducing degradation of performance of the antenna arranged on the second side surface 343b (or the third side surface 343c). For example, an electronic device 10 according to an embodiment may be configured such that the antenna performance in the flat state and the antenna performance in the folded state are identical.

A foldable electronic device (for example, the electronic device 700 of FIG. 7) according to various embodiments may include: a first housing (for example, the first housing structure 310 of FIG. 2) including a first surface (for example, the first surface 341 of FIG. 2), a second surface (for example, the second surface 342 of FIG. 2) facing in the opposite direction to the first surface 341, and a first side housing (for example, the first side housing 343 of FIG. 2) surrounding at least a part of a first space between the first surface 341 and the second surface 342; a second housing (for example, the second housing structure 320 of FIG. 2) including a third surface (for example, the third surface 351 of FIG. 2) which faces the first surface 341 of the first housing structure 310 when the foldable electronic device 700 is in a folded state, a fourth surface (for example, the fourth surface 352 of FIG. 2) facing in the opposite direction to the third surface 351, and a second side housing (for example, the second side housing 353 of FIG. 2) surrounding at least a part of a second space between the third surface 351 and the fourth surface 352; a hinge structure (for example, the hinge structure 340 of FIG. 4) arranged between the first housing structure 310 and the second housing structure 320 so as to form a folding axis (axis A); a flexible display (for example, the display 200 of FIG. 2) exposed through the first surface 341 and the third surface 351; and a communication circuit (for example, the communication module 190 of FIG. 1) arranged in the first space and/or the second space. Each of the first side housing 343 and the second side housing 353 may include a conductive portion. At least a part of the conductive portion of the first side housing 343 may be electrically connected to the communication circuit. A partial corner portion of the first surface 341 may be made of a low-permittivity material (for example, the low-permittivity material 710 of FIG. 7), and a partial corner portion of the third surface 351 may be made of the low-permittivity material 710. The specific permittivity of the low-permittivity material 710 may, for example, and without limitation, be lower than 10. The low-permittivity material 710 may include, for example, and without limitation, an injection-molded material. The first side housing 343 may include a first side surface 343a that is parallel with the folding axis (axis A), a second side surface 343b which is connected to one side of the first side surface 343a, and which is perpendicular to the folding axis (axis A), and a third side surface 343c which is connected to the other side of the first side surface 343a, and which is parallel with the second side surface 343b. The second side housing 353 may include a fourth side surface 353a which is parallel with the folding axis (axis A), a fifth side surface 353b which is connected to one side of the fourth side surface 353a, and which is arranged adjacent to the second side surface 343b when the foldable electronic device 700 is in the folded state, and a sixth side surface 353c which is connected to the other side of the fourth side surface 353a, and which is arranged adjacent to the third side surface 343c when the foldable electronic device 700 is in the folded state. At least a partial conductive portion of the conductive portion arranged on the second side surface 343b and the third side surface 343c may be electrically connected to the communication circuit. Corner portions of the first surface 341, which are adjacent to the second side surface 343b and the third side surface 343c, may be made of the low-permittivity material 710. Corner portions of the third surface 351, which are adjacent to the fifth side surface 353b and the sixth side surface 353c, may be made of the low-permittivity material 710. A corner portion of the first surface 341, which is adjacent to the first side surface 343a, may include a first protruding portion 610. A corner portion of the third surface 351, which is adjacent to the fourth side surface 353a, may include a second protruding portion 620 which contacts the first protruding portion 610 when the foldable electronic device 700 is in the folded state. When the foldable electronic device 700 is in the folded state, the first protruding portion 610 and the second protruding portion 620 may contact each other such that the second side surface 343b and the fifth side surface 353b are spaced apart from each other, and the third side surface 343c and the sixth side surface 353c are spaced apart from each other. Each of the first protruding portion 610 and the second protruding portion 620 may include a conductive portion. Each of the first protruding portion 610 and the second protruding portion 620 may include a nonconductive portion. The first protruding portion 610 and the second protruding portion 620 may have mutually symmetric shapes with reference to the folding axis (axis A). When the foldable electronic device 700 is in the folded state, the second side surface 343b and the fifth side surface 353b may be spaced apart from each other by an interval of 3-5 mm. The foldable electronic device may further include: a processor arranged in the first space and/or the second space and operatively connected to the communication circuit; and a memory arranged in the first space and/or the second space, operatively connected to the processor, and configured to store multiple application programs. The memory may store instructions that, when executed, cause the processor to receive a speech request through the communication circuit when the foldable electronic device 700 is in the folded state, to output a notification in response to reception of the speech request, and to provide a communication function while the foldable electronic device 700 remains in the folded state in response to reception of a designated input from the user.

Figure 8:
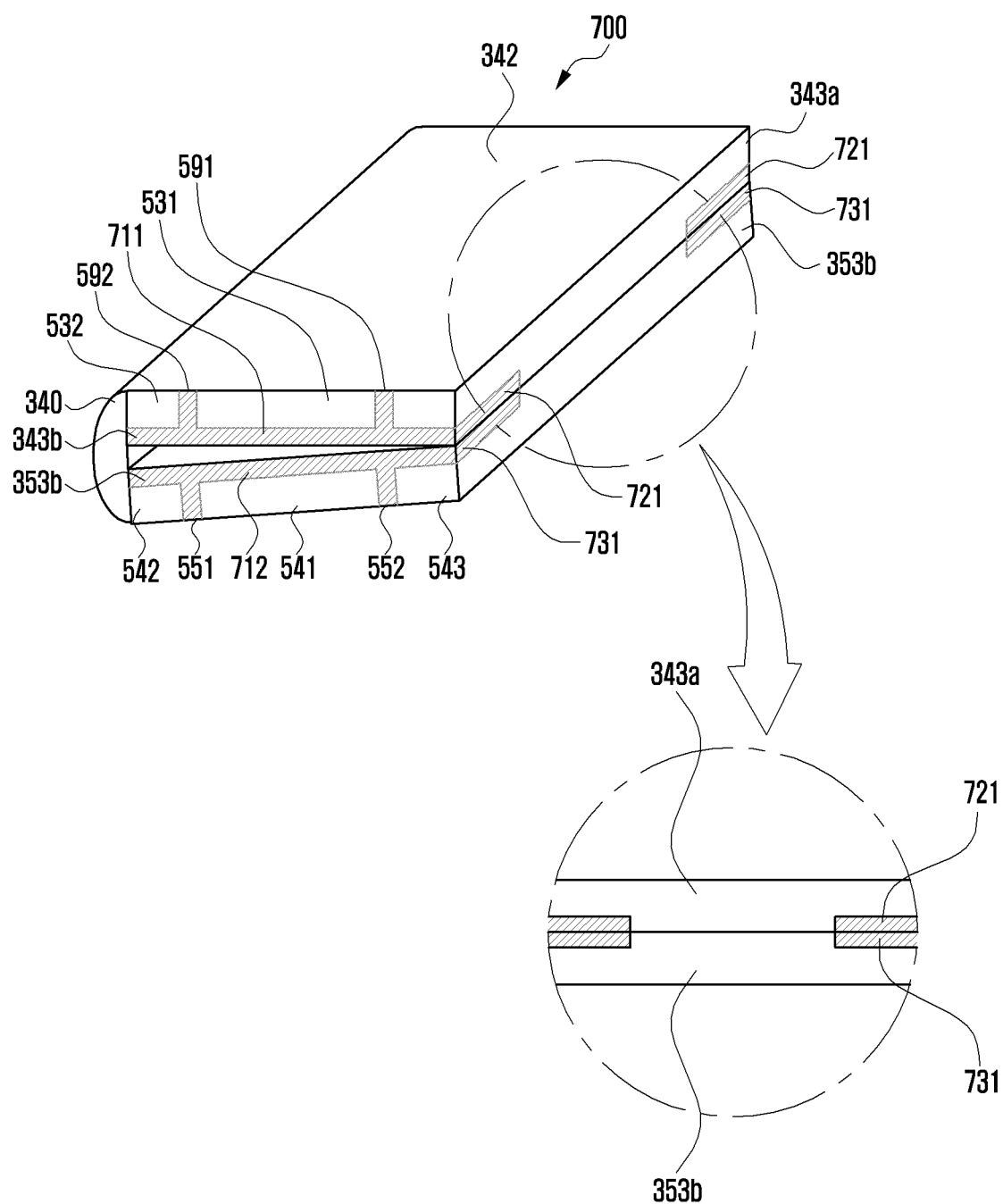
FIG. 8 is a diagram illustrating an example electronic device in a folded state according to another embodiment.

FIG. 7 is a diagram illustrating a first side housing and a second side housing of an example electronic device in a flat state according to another embodiment. FIG. 8 is a diagram illustrating an example electronic device in a folded state according to an embodiment.

The electronic device 700 illustrated in FIG. 7 and FIG. 8 may be substantially identical or similar to the electronic device 10 illustrated in FIG. 5 and FIG. 6, except for the elements described below. The same elements in FIG. 7 and FIG. 8 as those of the electronic device 10 illustrated in FIG. 5 and FIG. 6 are given the same reference numerals, and descriptions of the same elements made with reference to FIG. 5 and FIG. 6 will not be repeated here.

Referring to FIG. 7 and FIG. 8, the electronic device 700 according to another embodiment may have a low-permittivity material 710 formed in an area adjacent to or overlapping with a portion of the foldable housing 300, which is used as an antenna. For example, low-permittivity materials 711, 721, and 722 may be formed on partial corner portions of the first surface 341 of the first housing structure 310, and low-permittivity materials 712, 731, and 732 may be formed on partial corner portions of the third surface 351 of the second housing structure 320.

For example, a first low-permittivity material 711 may be formed on a partial corner of the first surface 341, and the first low-permittivity material 711 may be arranged to overlap with first to third conductive portions 531, 532, and 533 of the first side housing 343, which are used as antennas. Similarly, a second low-permittivity material 712 may be formed on a partial corner of the third surface 351, and the second low-permittivity material 712 may be arranged to face the first low-permittivity material 711 of the first surface 341 when the electronic device 700 is in the folded state.

As another example, the first housing structure 310 may have a first low-permittivity material 711 formed on the surface of corner portions of the first surface 341, which are adjacent to the second side surface 343b and the third side surface 343c. Similarly, the second housing structure 320 may have a second low-permittivity material 712 formed on the surface of corner portions of the third surface 351, which are adjacent to the fifth side surface 353b and the sixth side surface 353c.

In an embodiment, the first low-permittivity material 711 and the second low-permittivity material 712 may be arranged to be symmetric to each other with reference to the folding axis (axis A). In an embodiment, the first low-permittivity material 711 and the second low-permittivity material 712 may face or contact each other when the electronic device 700 is in the folded state.

The low-permittivity material may be as follows. The permittivity may be a physical unit indicating the influence of a medium on an electric field. The higher the permittivity of the medium, the lower the intensity of the electric field acting on the medium. In connection with defining the permittivity, it is possible to use a specific permittivity, which indicates a comparison between the permittivity in a vacuum state and the permittivity of a specific material. For example, the specific permittivity of a material may be defined by Equation 1 below:

$$\varepsilon_r = \frac{\varepsilon}{\varepsilon_0} \qquad \text{[Equation 1]}$$

($\varepsilon_r$=specific permittivity, $\varepsilon$=permittivity of the material, and $\varepsilon_0$=permittivity in the vacuum state)

Example specific permittivities of materials are given in Table 1 below. In an embodiment, in view of the antenna performance, the low-permittivity material may be defined as a material, the specific permittivity of which is lower than 10.

TABLE 1

| Material | Specific permittivity $\varepsilon_r$ |
| --- | --- |
| vacuum | 1 |
| air | 1.0006 |
| paraffin | 2.0-2.3 |
| paper | 1.2-2.6 |
| quartz | 8.3 |
| normal injection-molding (PC) | 1-2 |
| injection molding + rigidity reinforcement (PC + GF etc.) | 3-4 |
| glass | 6-10 |
| water | 80.7 |
| metal | ∞ |

An electronic device 700 according to an embodiment may have a first low-permittivity material 711 formed on a partial corner portion of the first surface 341, which is adjacent to the antenna, and may have a second low-permittivity material 712 formed in an area of the third surface 351 of the second housing structure 320, which faces the first low-permittivity material 711 when the electronic device 700 is in the folded state, thereby reducing the effect of coupling of energy radiated from the antenna arranged on the second side surface 343b with the conductive portion of the fifth side surface 353b, and consequently improving the radiation performance of the antenna arranged on the second side surface 343b. Similarly, an electronic device 700 according to an embodiment may reduce the effect of coupling of energy radiated from the antenna arranged on the third side surface 343c when the electronic device 700 is in the folded state with the conductive portion of the sixth side surface 353c, consequently improving the radiation performance of the antenna arranged on the third side surface 343c.

In an embodiment, since a part of the seventh conductive portion 571 arranged on the first side surface 343a (for example, the upper side and the lower side of the seventh conductive portion 571 illustrated in FIG. 5) is used as an antenna, a third low-permittivity material 721 may be formed on a corner portion of the first surface 341, which overlaps with the part of the first side surface 343a that is used as an antenna. Similarly, a fourth low-permittivity material 731 may be formed in an area of the corner portion of the third surface 351, which overlaps with a part of the fourth side surface 353a, and which faces the third low-permittivity material 721 when the electronic device 700 is in the folded state.

In an embodiment, a part of the boundary portion between the first housing 310 and the hinge structure 340 may be used as an antenna, and a fifth low-permittivity material 722 may be formed on the part used as an antenna. Similarly, a part of the boundary portion between the second housing structure 320 and the hinge structure 340 may be used as an antenna, and a sixth low-permittivity material 732 may be formed on the part used as an antenna.

In an embodiment, the low-permittivity material may include an injection-molded material. In an embodiment, the low-permittivity material may be made of the same material as the nonconductive portions formed on the first housing structure 310 and the second housing structure 320. For example, the low-permittivity material and the nonconductive portions may be made of an injection-molded material.

Figure 9:
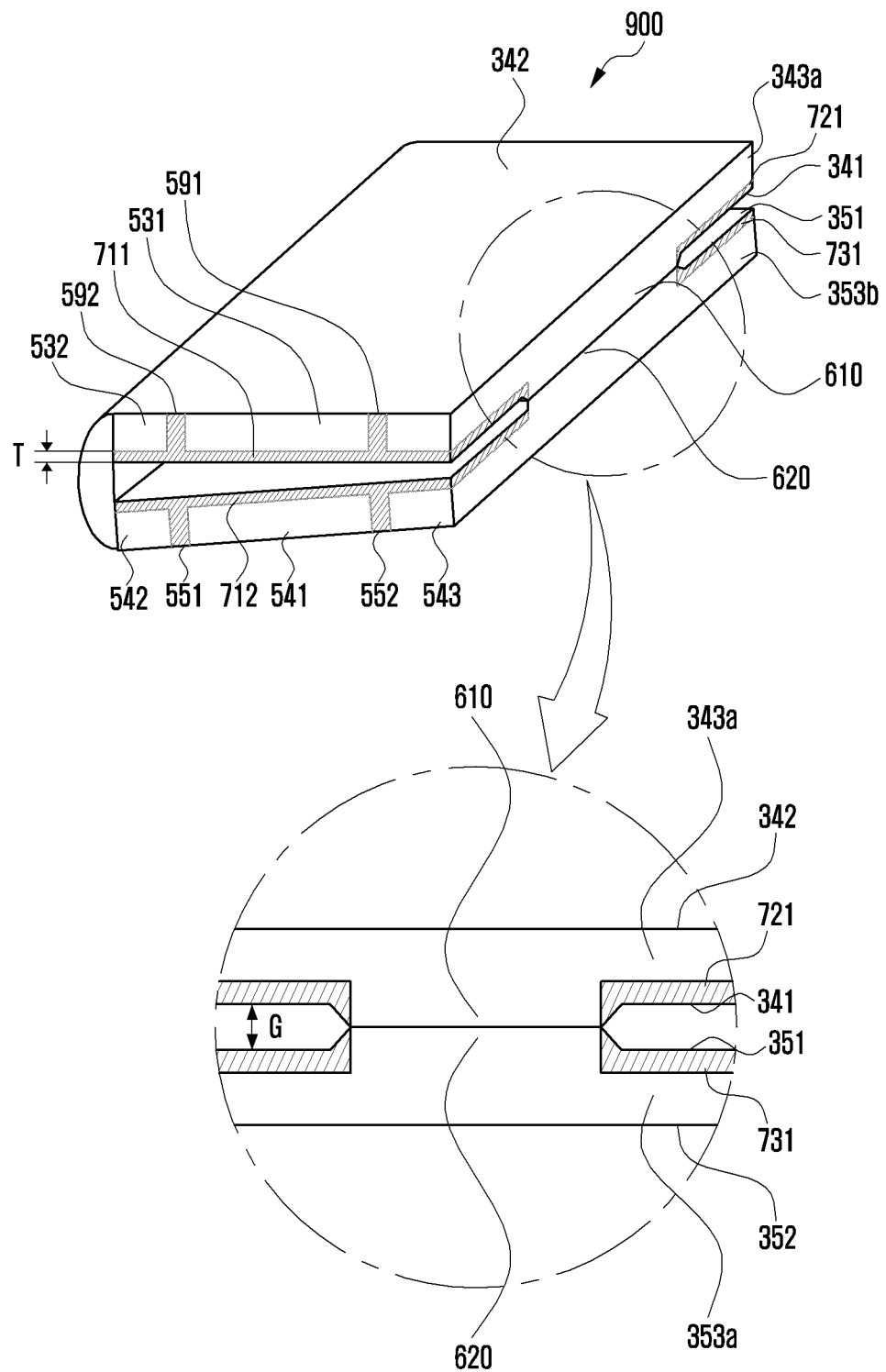
FIG. 9 is a diagram illustrating an example electronic device in a folded state according to another embodiment.

FIG. 9 is a diagram illustrating an example electronic device in a folded state according to an embodiment.

The electronic device 900 illustrated in FIG. 9 may be substantially identical or similar to the electronic device 700 illustrated in FIG. 7 and FIG. 8, except for the elements described below. The same elements in FIG. 9 as those of the electronic device 700 illustrated in FIG. 7 and FIG. 8 are given the same reference numerals, and descriptions of the same elements made with reference to FIG. 7 and FIG. 8 will not be repeated here.

Referring to FIG. 9, the electronic device 900 according to another embodiment may have a first protruding portion 610 formed on a corner portion of the first surface 341, which is parallel with the folding axis (axis A), and a second protruding portion 620 formed on a corner portion of the third surface 351, which is parallel with the folding axis (axis A), so as to contact the first protruding portion 610 when the electronic device 10 is in the folded state. For example, the first protruding portion 610 may be formed adjacent to a portion 571b of the seventh conductive portion 571 arranged on the first side surface 343a, which is not used as an antenna, such as the portion 501 indicated by the dotted lines in FIG. 5. As another example, the first protruding portion 610 may be arranged to overlap with a part 571b of the seventh conductive portion 571 when viewed from the front of the electronic device 10 (when seen from above the display of the electronic device 10), and the overlapping part of the seventh conductive portion 571 may be a portion 571b that is not used as an antenna. Similarly, the second protruding portion 620 may be formed adjacent to the conductive portion 572 of the fourth side surface 353a, such as the other portion 502 indicated by the dotted lines in FIG. 5. As another example, the second protruding portion 620 may be arranged to overlap with a part of the conductive portion 572 of the fourth side surface 353a when viewed from the front of the electronic device 10 (when seen from above the display of the electronic device 10).

Figure 10:
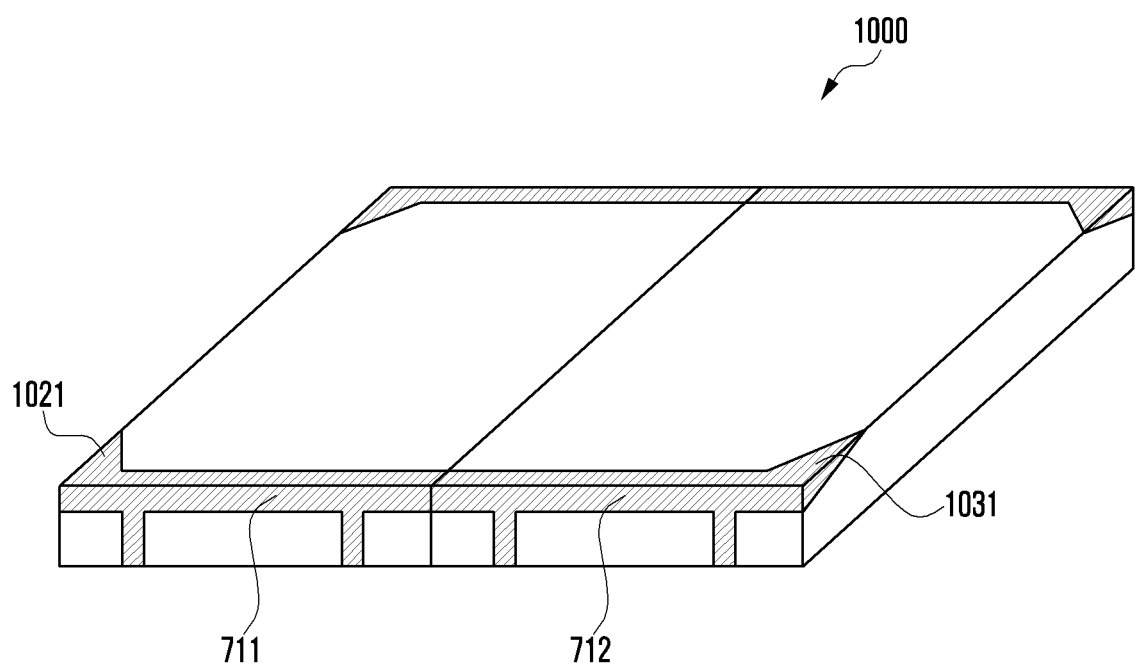
FIG. 10 is a diagram illustrating an example electronic device in a flat state according to another embodiment.
Figure 11:
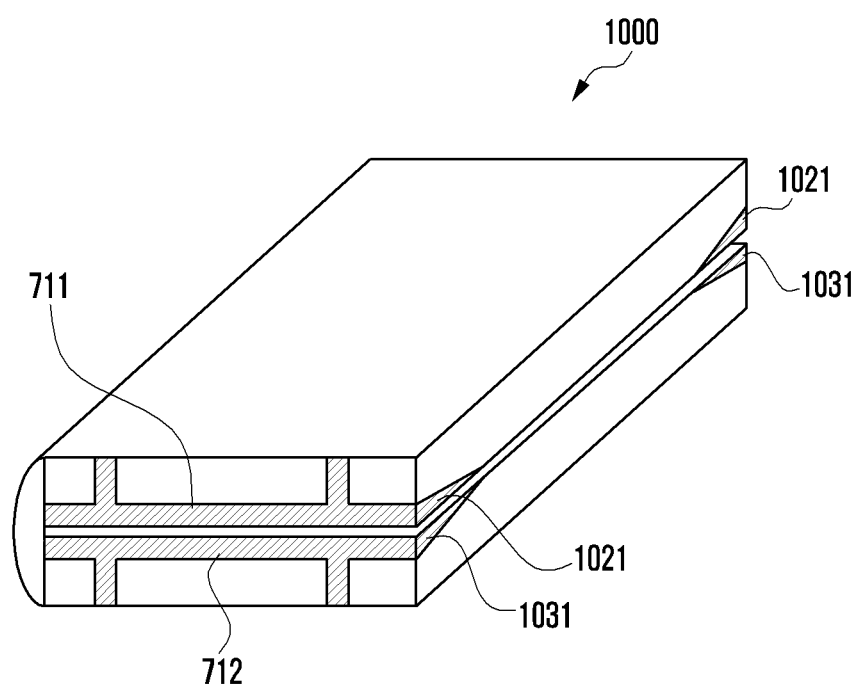
FIG. 11 is a diagram illustrating the example electronic device illustrated in FIG. 10 in a folded state.

FIG. 10 is a diagram illustrating an example electronic device in a flat state according to another embodiment. FIG. 11 is a diagram illustrating the electronic device illustrated in FIG. 10 in a folded state.

The electronic device 1000 illustrated in FIG. 10 and FIG. 11 may be substantially identical or similar to the electronic device 700 illustrated in FIG. 7 and FIG. 8, except for the elements described below. In FIG. 10 and FIG. 11, reference numerals are given only to elements different from those of the electronic device 700 illustrated in FIG. 7 and FIG. 8.

Referring to FIG. 10 and FIG. 11, the electronic device 1000 according to another embodiment may have a low-permittivity material formed on at least a part of the foldable housing 300, and the low-permittivity material may be formed to overlap with a conductive portion used as an antenna. In the case of the electronic device 1000 according to another embodiment illustrated in FIG. 10 and FIG. 11, the length, shape, width, thickness, or structure of the low-permittivity material may be variously modified, unlike the electronic device 700 illustrated in FIG. 7 and FIG. 8. For example, a first low-permittivity material 711 may be formed on a partial corner of the first surface 341, and the first low-permittivity material 711 may be arranged to overlap with conductive portions of the first side housing 343, which are used as antennas (for example, the first to third conductive portions 531, 532, and 533 of FIG. 7). Similarly, a second low-permittivity material 712 may be formed on a corner of the third surface 351, and the second low-permittivity material 712 may be arranged to face the first low-permittivity material 711 of the first surface 341 when the electronic device 700 is in the folded state.

In the illustrated embodiment, since a part of the seventh conductive portion 571 arranged on the first side surface 343a (for example, the upper side and the lower side of the seventh conductive portion 571 illustrated in FIG. 5) is used as an antenna, a third low-permittivity material 1021 may be formed on a corner portion of the first surface 341, which overlaps with the part of the first side surface 343a that is used as an antenna. Similarly, a fourth low-permittivity material 1031 may be formed in an area of the corner portion of the third surface 351, which overlaps with a part of the fourth side surface 353a, and which faces the third low-permittivity material 1021 when the electronic device 700 is in the folded state.

In the illustrated embodiment, the shape, width, thickness, or structure of each of the third low-permittivity material 1021 and the fourth low-permittivity material 1031 may not be constant. For example, the third low-permittivity material 1021 may be formed on the first side surface 343a and on the front surface of the electronic device 1000, which is adjacent to the first side surface 343a, such that the width or thickness thereof is not constant. Similarly, the fourth low-permittivity material 1031 may be formed on the third side surface 343c and on the front surface of the electronic device 1000, which is adjacent to the third side surface 343*c*, such that the width or thickness of the fourth low-permittivity material 1031 is not constant.

In various embodiments, the arrangement, shape, width, thickness, or structure of the low-permittivity material may be variously modified, in addition to the illustrated example.

Figure 12:
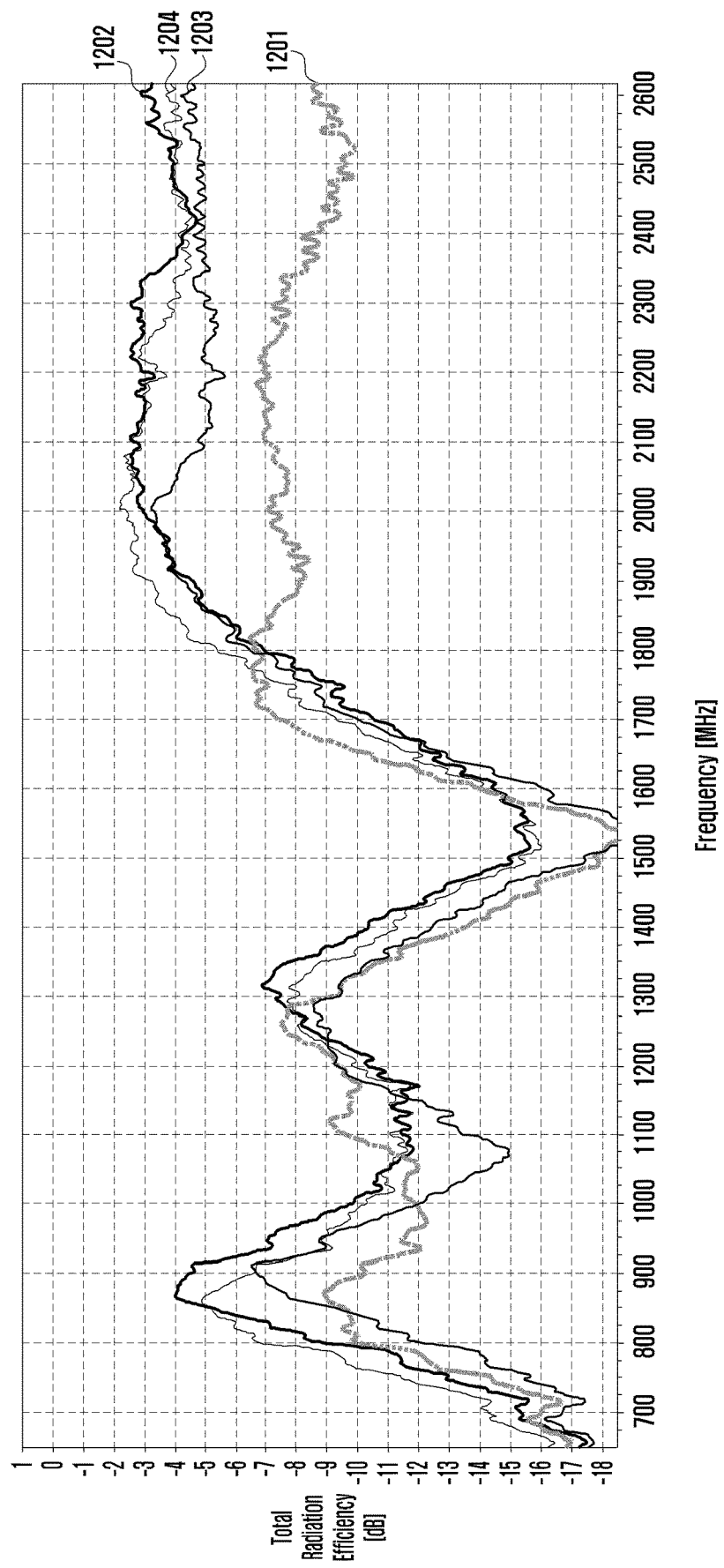
FIG. 12 is a graph illustrating measured antenna performance of an example electronic device according to various embodiments.

FIG. 12 is a graph illustrating the measured antenna performance of an electronic device according to various embodiments.

In FIG. 12, the x-axis may denote the frequency, and the y-axis may denote the antenna radiation efficiency.

In FIG. 12, reference numeral 1201 refers to a measured antenna performance when a foldable electronic device according to a comparative example is in a folded state, and reference numeral 1202 refers to a measured antenna performance when the foldable electronic device according to the comparative example is in a flat state.

The experimental conditions for testing the foldable electronic device according to a comparative example were as follows. The foldable electronic device according to a comparative example was designed such that most of the foldable housing thereof was made of a metallic material, and a part of the foldable housing was used as an antenna. As illustrated, it can be understood that, since the housing of the foldable electronic device according to a comparative example, which is adjacent to the antenna, is made of a metallic material, the antenna performance in the folded state is inferior to the antenna performance in the flat state.

In FIG. 12, reference numerals 1203 and 1204 refer to measured antenna performance when an electronic device according to various embodiments is in a folded state. Reference numeral 1203 refers to a measured antenna performance under the condition that the first housing structure and the second housing structure are spaced apart from each other by an interval of, for example, about 1 mm, and reference numeral 1204 refers to a measured antenna performance under the condition that the first housing structure and the second housing structure are spaced apart from each other by an interval of, for example, about 2 mm.

It can be understood from the reference numeral 1204 in the graph that, when the electronic device according to various embodiments is in a folded state, the first housing structure and the second housing structure are spaced apart from each other by an interval of, for example, about 2 mm, thereby maintaining antenna performance comparable to the antenna performance in the flat state. It is to be noted that, in an example embodiment, the interval between the first housing structure and the second housing structure, that is, the interval between the second side surface and the fifth side surface (or between the third side surface and the sixth side surface), may preferably be in a range of, for example, about 3-5 mm.

Figure 13:
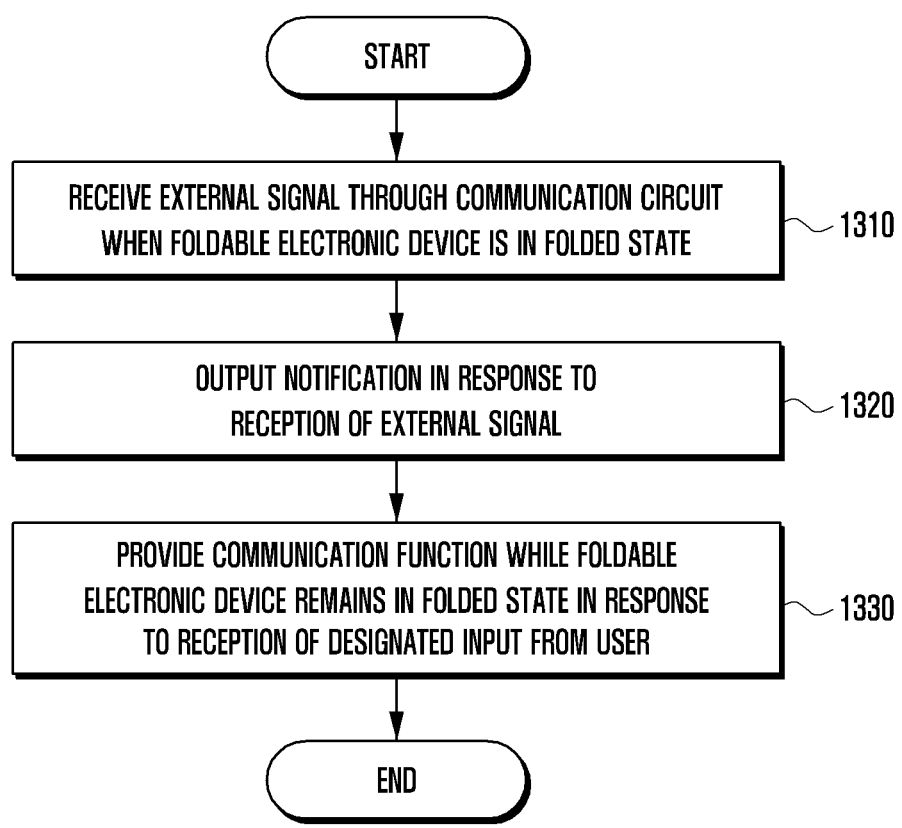
FIG. 13 is a flowchart illustrating an example method for driving an electronic device according to an embodiment.

FIG. 13 is a flowchart illustrating an example method for driving an electronic device 10 according to an embodiment.

In operation 1310, the electronic device 10 according to an embodiment may receive an external signal through the communication circuit when the foldable electronic device 10 is in a folded state. For example, the electronic device 10 may receive a speech request while the foldable electronic device 10 remains folded.

In operation 1320, the electronic device 10 according to an embodiment may output a notification in response to reception of the external signal. For example, the electronic device 10 may output a designated notification in response to reception of a speech request. The designated notification may include, for example, and without limitation, a bell sound, a voice notification, and/or a vibration, or the like.

In operation 1330, the electronic device 10 according to an embodiment may provide a communication function while the foldable electronic device 10 remains folded in response to reception of a designated input from the user. The designated input may include, for example, and without limitation, a designated touch gesture, an input through a designated physical key, a designated voice command, or the like. The electronic device 10 according to an embodiment may provide a communication function while remaining in the folded state and, since the antenna performance is not degraded even if the electronic device 10 is in the folded state, the reliability can be improved while the communication function is provided.

Figure 14:
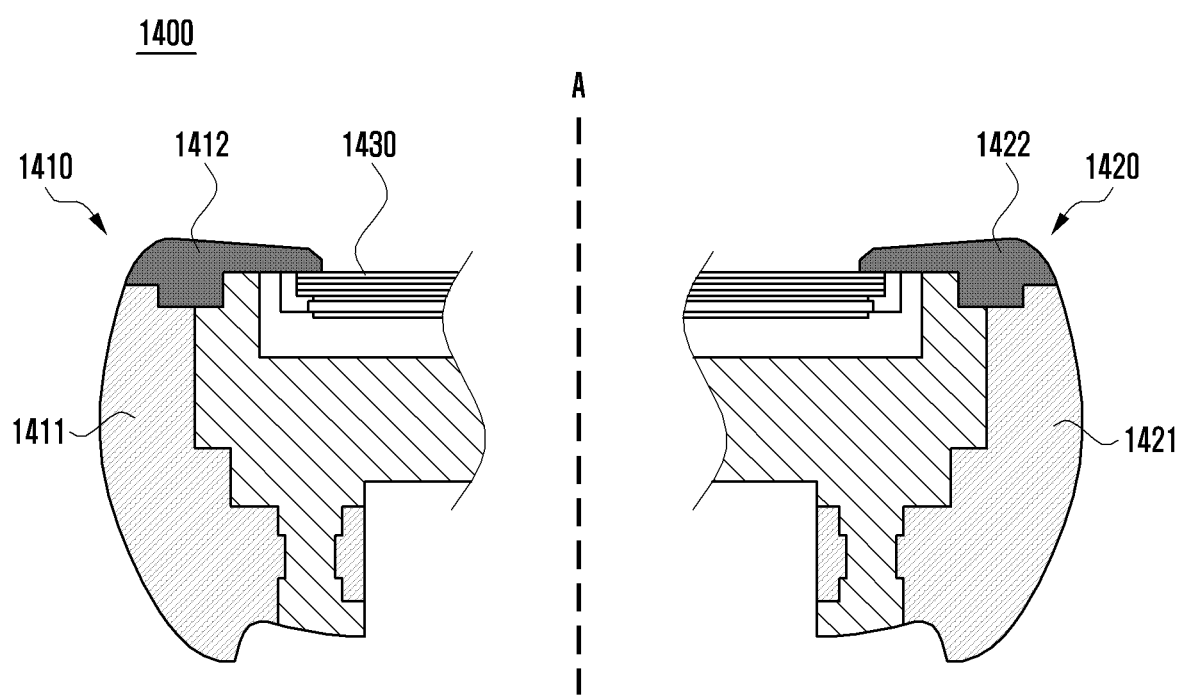
FIG. 14 is a diagram illustrating an example section of a part of each of a first housing and a second housing according to an embodiment.
Figure 15:
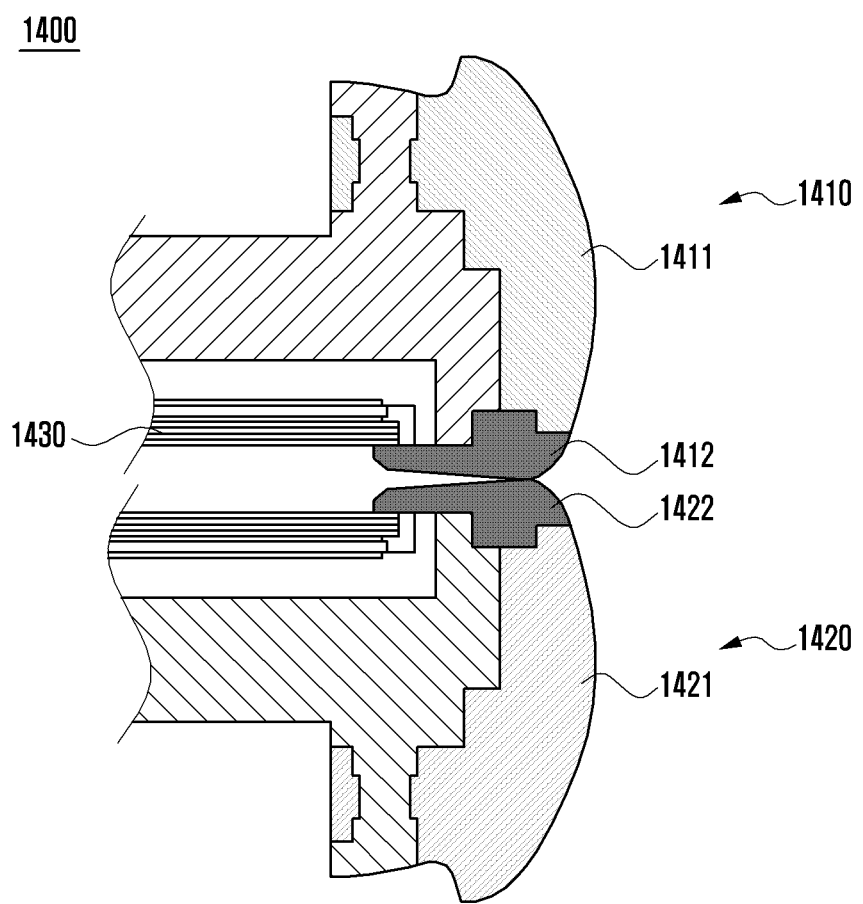
FIG. 15 is a diagram illustrating an example section of a part of each of a first housing and a second housing when an electronic device is in a folded state according to an embodiment.

FIG. 14 is a diagram illustrating an example section of a part of each of a first housing structure and a second housing structure according to an embodiment. FIG. 15 is a diagram illustrating an example section of a part of each of a first housing structure and a second housing structure when an electronic device according to an embodiment is in a folded state. According to an embodiment, FIG. 14 and FIG. 15 may illustrate a part of each of the first housing structure 310 and the second housing structure 320 illustrated in FIG. 7 and FIG. 8.

Referring to FIG. 14, the side surface of a first housing structure 1410 according to an embodiment (for example, the first housing structure 310 of FIG. 2) may include a conductive portion 1411 and a nonconductive portion 1412. For example, a part of the conductive portion 1411 of the first housing structure 1410 may be used as an antenna, and a nonconductive portion 1412 may be formed in an area overlapping with the conductive portion 1411 that is used as an antenna.

According to an embodiment, the nonconductive portion 1412 may be formed on the conductive portion 1411 (for example, on the upper side of the conductive portion 1411 when seen in FIG. 14) so as to be exposed when seen from above the display 1430 (for example, the display 200 of FIG. 2). Similarly, the side surface of the second housing structure 1420 (for example, the second housing structure 320 of FIG. 2) may include a conductive portion 1421 and a nonconductive portion 1422. According to an embodiment, the conductive portion 1421 and the nonconductive portion 1422 of the second housing structure 1420 may be formed to be symmetric with the conductive portion 1411 and the nonconductive portion 1412 of the first housing structure 1410 with reference to the folding axis (axis A) (for example, the folding axis (A) of FIG. 5).

In the illustrated example, the nonconductive portion 1412 of the first housing structure 1410 and the nonconductive portion 1422 of the second housing structure 1410 may be the low-permittivity material 710 illustrated in FIG. 7 and FIG. 8.

Referring to FIG. 15, the nonconductive portion 1412 of the first housing structure 1410 according to an embodiment and the nonconductive portion 1422 of the second housing structure 1420 may face or contact each other when the electronic device 1400 is in the folded state. The electronic device 1400 according to various embodiments may reduce degradation of the antenna performance by spacing the conductive portion 1411 of the first housing structure 1410 and the conductive portion 1421 of the second housing structure 1420 apart from each other when the electronic device 1400 is in the folded state. The electronic device 1400 according to various embodiments may reduce the phenomenon of coupling of energy radiated from the conductive portion 1411 of the first housing structure 1410 with the conductive portion 1421 of the second housing structure 1420.

Figure 16:
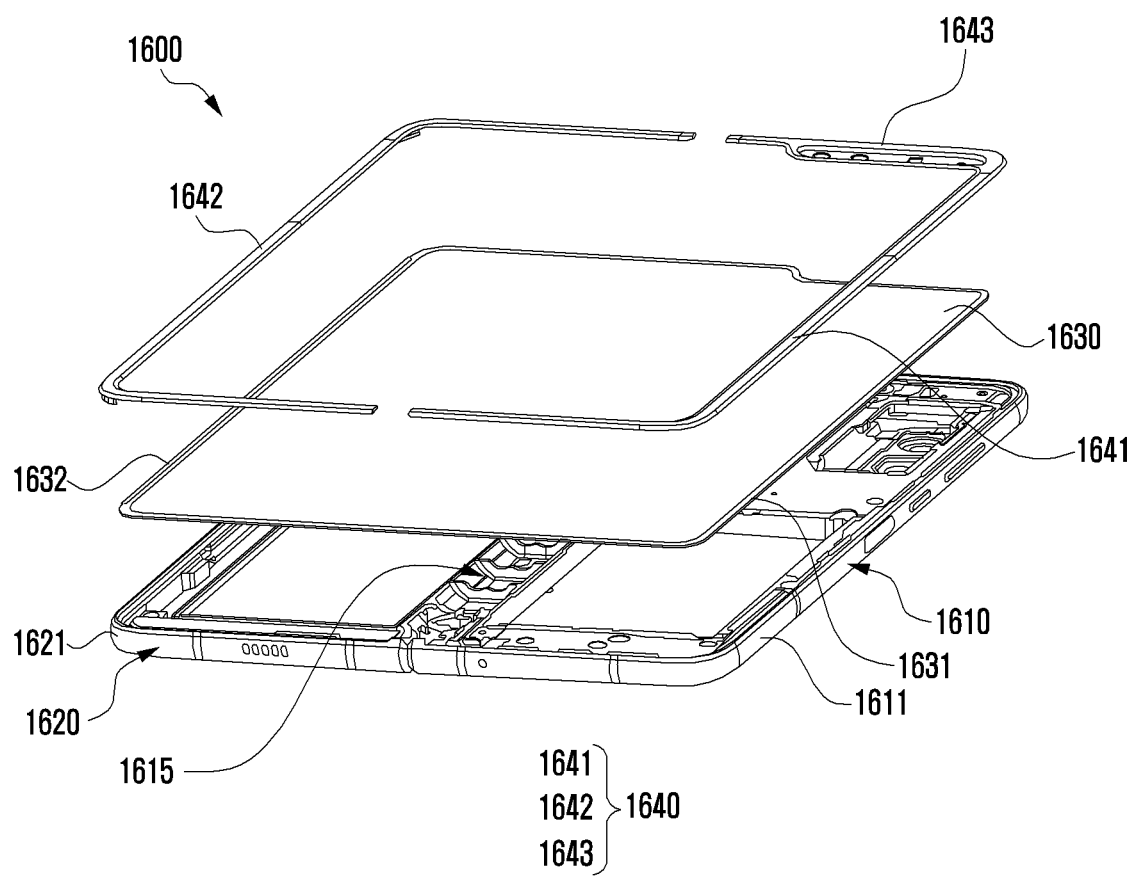
FIG. 16 is an exploded perspective view of an example electronic device including a frame according to various embodiments.

FIG. 16 is an exploded perspective view of an example electronic device including a frame according to various embodiments.

According to various embodiments, the electronic device 1600 of FIG. 16 (for example, the electronic device 101 of FIG. 1) may be at least partially similar to the electronic devices illustrated in FIG. 2 to FIG. 11.

Referring to FIG. 16, the electronic device 1600 according to various embodiments may include: a foldable housing 1610 or 1620 (for example, the foldable housing 300 of FIG. 3), at least a part of which is folded using a hinge structure 1615 (for example, the hinge structure 340 of FIG. 4); a flexible display 1630 (for example, the display 200 of FIG. 2) loaded (e.g., disposed) on the foldable housing 1610 or 1620 such that at least a part thereof is configured to be folded; a frame 1640 loaded (e.g., disposed) on the boundary portions 1631 and 1632 of the flexible display 1630 or on at least a part of the boundary portions and coupled to the foldable housing 1610 or 1620.

According to an embodiment, the foldable housing 1610 or 1620 may include a first housing structure 1610 (for example, the first housing structure 310 of FIG. 2) disposed on one side of the hinge structure 1615 with reference to the hinge structure 1615, or a second housing structure 1620 (for example, the second housing structure 320 of FIG. 2) disposed on the other side of the hinge structure 1615.

According to an embodiment, the foldable housing 1610 or 1620 may include a first side member 1611 (for example, the first side housing 343 of FIG. 2) surrounding a first space disposed on one side of the hinge structure 1615, and a second side member 1621 (for example, the second side housing 353 of FIG. 2) surrounding a second space disposed on the other side of the hinge structure 1615.

The entire boundary portion of the front surface of the foldable housing 1610 or 1620 of the electronic device 1600 according to various embodiments may include a low-permittivity material (for example, the low-permittivity materials 712, 731, and 732 of FIG. 7). For example, the electronic device 1600 according to various embodiments may include a frame 1640 disposed on the boundary portion of each of the first surface (for example, the first surface 341 of FIG. 2) and the third surface (for example, the third surface 351 of FIG. 2), which are configured to face each other in the folded state of the foldable housing 1610 or 1620, and the frame 1640 may include the low-permittivity material. The electronic device 1600 according to an embodiment may have a first frame 1641 or a second frame 1642 disposed on the boundary portion of the flexible display 1630 in the unfolded state of the foldable housing 1610 or 1620, when the flexible display 1630 is viewed from above. According to an embodiment, the frame 1640 may be a component substantially identical or similar to the non-conductive portion 1412 and the nonconductive portion 1422 illustrated in FIG. 14 and FIG. 15. In various example non-limiting commercial implementations, the frame 1640 may include, for example, and without limitation, various decorative elements for aesthetic purposes.

According to an embodiment, the frame 1640 may include a first frame 1641 overlapping the first housing structure 1610, or a second frame 1642 overlapping the second housing structure 1620.

According to an embodiment, the first frame 1641 and the second frame 1642 may contact each other or approach each other such that the distance between thereof is equal to or less than a designated distance, in the folded state of the foldable housing 1610 or 1620.

According to an embodiment, the first frame 1641 may be coupled to the first side member 1611 while covering a boundary portion of the flexible display 1630 such that the first boundary portion 1631 of the flexible display 1630 disposed on the first housing structure 1610, for example, the first non-display area thereof, is not exposed to the outside.

According to an embodiment, the second frame 1642 may be coupled to the second side member 1621 while covering another boundary portion of the flexible display 1630 such that the second boundary portion 1632 of the flexible display 1630 disposed on the second housing structure 1620, for example, the second non-display area thereof, is not exposed to the outside.

According to an embodiment, at least one sensor may be disposed on the outer periphery of the flexible display 1630, and a third frame 1643 including the low-permittivity material may be disposed on the boundary portion of a sensor area (for example, the sensor area 324 of FIG. 2) in which the sensor is disposed. According to an embodiment, the third frame 1643 may be formed integrally with the first frame 1641.

According to an embodiment, the frame 1640 may include a low-permittivity material having a specific permittivity less than 10. According to an embodiment, the frame 1640 may include, for example, and without limitation, an injection-molded material.

According to an embodiment, the frame 1640 may include a polymer material or a metal material, and may be coupled to respective housing structures 1610 or 1620 using at least one of bonding, taping, thermal attachment, or structural coupling.

According to various example embodiments, the electronic device may operate in an out-folding type unlike the examples illustrated in FIG. 2 to FIG. 11. According to various embodiment, the second surface (for example, the second surface 342 of FIG. 2) and the fourth surface (for example, the fourth surface 352 of FIG. 2) of the electronic device may face each other in the folded state of the foldable housing. The electronic device according to various example embodiments may have structures including a low-permittivity material having a specific permittivity less than 10 and disposed on at least a part of the boundary portion of the second surface (for example, the second surface 342 of FIG. 2) and on at least a part of the boundary portion of the fourth surface (for example, the fourth surface 352 of FIG. 2), respectively. The electronic device, configured as above, may have reduced antenna performance degradation in the folded sate of the foldable housing.

The electronic device according to various embodiments may be one of various types of electronic devices. The electronic devices may include, for example, and without limitation, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various example embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements.

It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply refers to a storage medium that is a tangible device, but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturers server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While various example embodiments of the disclosure have been illustrated and described herein, it will be understood that various changes in form and detail may be made without departing from the true spirit and full scope of the disclosure as may be defined, for example, in the appended claims and their equivalents.

What is claimed is:

1. An electronic device comprising:
a foldable housing comprising a hinge, a first side member surrounding a first space disposed on a first side of the hinge, and a second side member surrounding a second space disposed on a second side of the hinge, wherein at least one of the first side member or the second side member comprises a conductive portion operably connected to a communication circuit; and
a flexible display disposed on the foldable housing, wherein the flexible display comprises a first region, and a second region facing the same direction with the first region in an unfolded state of the foldable housing, the first region and the second region configured to be directed in opposite directions in a folded state of the foldable housing,
wherein the foldable housing further comprises a non-conductive portion including a low-permittivity material having a specific permittivity less than 10, the non-conductive portion comprising a first non-conductive portion coupled to the first side member and covering a first boundary portion of the flexible display disposed on the first side of the hinge, and a second non-conductive portion coupled to the second side member and covering a second boundary portion of the flexible display disposed on the second side of the hinge, and
wherein, in the folded state of the foldable housing, the first non-conductive portion and the second non-conductive portion are configured to face each other.

2. The electronic device of claim 1, wherein, in the folded state of the foldable housing, the first non-conductive portion and the second non-conductive portion are disposed to contact each other or to be within a distance of each other such that the distance between the first non-conductive portion and the second non-conductive portion is equal to or less than a designated distance.

3. The electronic device of claim 1, wherein the low-permittivity material comprises an injection-molded material.

4. The electronic device of claim 1, wherein, in the unfolded state of the foldable housing, at last one of the first non-conductive portion or the second non-conductive portion is disposed on a boundary portion of the flexible display when the flexible display is viewed from above.

5. The electronic device of claim 1, wherein the electronic device further comprises at least one sensor disposed on an outer periphery of the flexible display and exposed through a front surface of the electronic device to which the flexible display is exposed, and
a third non-conductive portion comprising the low-permittivity material is disposed on a boundary portion of a sensor area in which the at least one sensor is disposed, and
wherein the third non-conductive portion is integral with the first non-conductive portion.

6. The electronic device of claim 1, further comprising: a processor operatively connected to the communication circuit; and
a memory operatively connected to the processor, wherein the memory stores instructions that, when executed by the processor, control the processor to receive an external signal through the communication circuit in the folded state of the foldable housing, to output a notification in response to reception of the external signal, and to provide a communication function in the folded state of the foldable housing in response to reception of a designated input.

7. The electronic device of claim 6, wherein the communication function comprises a speech function.

8. The electronic device of claim 1, wherein the first side member comprises a first protruding portion facing the same direction with the first region of the flexible display; and
wherein the second side member comprises a second protruding portion facing the same direction with the second region of the flexible display and configuring to contact the first protruding portion in the folded state of the foldable housing.

9. The electronic device of claim 8, wherein each of the first protruding portion and the second protruding portion comprises a conductive portion.

10. The electronic device of claim 8, wherein each of the first protruding portion and the second protruding portion comprises the nonconductive portion.

11. The electronic device of claim 8, wherein the first protruding portion and the second protruding portion have mutually symmetric shapes with reference to a folding axis of the foldable housing.

* * * * *